United States Patent
Samejima et al.

(10) Patent No.: US 10,927,479 B2
(45) Date of Patent: Feb. 23, 2021

(54) PRODUCING DEVICE AND PRODUCING METHOD FOR CHOPPED FIBER BUNDLES, PRODUCING DEVICE AND PRODUCING METHOD FOR FIBER-REINFORCED RESIN FORMING MATERIALS, CUTTING BLADE FOR CARBON FIBER BUNDLES, AND ROTARY CUTTER FOR CARBON FIBER BUNDLES

(71) Applicant: Mitsubishi Chemical Corporation, Chiyoda-ku (JP)

(72) Inventors: Tadao Samejima, Tokyo (JP); Ryuichi Ishikawa, Tokyo (JP); Hiroshi Iwata, Tokyo (JP); Yukihiro Mizutori, Tokyo (JP); Masatoshi Kamata, Tokyo (JP); Yasushi Watanabe, Tokyo (JP); Hajime Okutsu, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 54 days.

(21) Appl. No.: 15/925,849

(22) Filed: Mar. 20, 2018

(65) Prior Publication Data
US 2018/0209076 A1 Jul. 26, 2018

Related U.S. Application Data

(63) Continuation of application No. PCT/JP2016/080953, filed on Oct. 19, 2016.

(30) Foreign Application Priority Data

Oct. 21, 2015 (JP) .............................. JP2015-207482
Nov. 5, 2015 (JP) .............................. JP2015-217457
Mar. 23, 2016 (JP) .............................. JP2016-058807

(51) Int. Cl.
*D01G 1/04* (2006.01)
*D06H 7/02* (2006.01)
(Continued)

(52) U.S. Cl.
CPC .............. *D01G 1/04* (2013.01); *B26D 1/0006* (2013.01); *B26D 1/40* (2013.01); *B26D 1/405* (2013.01);
(Continued)

(58) Field of Classification Search
CPC ............ B26D 1/0006; B26D 2001/002; B26D 2001/0026; C03B 37/16
See application file for complete search history.

(56) References Cited

U.S. PATENT DOCUMENTS 2,219,357 A * 10/1940 Dreyfus .................. D01G 1/10
19/0.48
4,344,786 A * 8/1982 Symborski ............. B65H 51/08
229/91
(Continued)

FOREIGN PATENT DOCUMENTS

CN 107848146 A 3/2018
DE 10 2010 018 485 A1 11/2011
(Continued)

OTHER PUBLICATIONS

Japanese Office Action dated Aug. 28, 2018 in Patent Application No. 2017-213293 with unedited computer generated English translation obtained by Global Dossier on Sep. 4, 2018, 9 pages.
(Continued)

*Primary Examiner* — Andrea L Wellington
*Assistant Examiner* — Richard D Crosby, Jr.
(74) *Attorney, Agent, or Firm* — Oblon, McClelland, Maier & Neustadt, L.L.P.

(57) ABSTRACT

One mode of the invention relates to a producing a device for chopped fiber bundles having a chopper unit including a
(Continued)

cutting blade for cutting long fiber bundles, a guide for restricting the travel direction of the fiber bundles to be supplied to the cutting means, and a structure, provided between the chopper unit and the guide, that widens the fiber bundles. The invention also relates to method for producing chopped fiber bundles by widening fiber bundles while restricting the travel direction of the long fiber bundles to be supplied to chopper unit by a guide, and obtaining chopped fiber bundles by cutting the fiber bundles with the chopper unit.

15 Claims, 13 Drawing Sheets

(51) Int. Cl.

| | | |
|---|---|---|
| B29C 70/50 | (2006.01) | |
| B26D 1/40 | (2006.01) | |
| D01G 1/10 | (2006.01) | |
| B29B 15/12 | (2006.01) | |
| B26D 1/00 | (2006.01) | |
| C03B 37/16 | (2006.01) | |
| C08J 5/04 | (2006.01) | |
| D04H 1/4242 | (2012.01) | |

(52) U.S. Cl.
CPC ............ *B29B 15/122* (2013.01); *B29C 70/50* (2013.01); *C03B 37/16* (2013.01); *C08J 5/042* (2013.01); *D01G 1/10* (2013.01); *D06H 7/02* (2013.01); *B26D 2001/0026* (2013.01); *B26D 2001/0046* (2013.01); *D04H 1/4242* (2013.01); *Y02P 40/57* (2015.11)

(56) References Cited

U.S. PATENT DOCUMENTS

| | | | | |
|---|---|---|---|---|
| 4,373,650 A * | 2/1983 | Gay | ........................ | D01G 1/04 225/103 |
| 4,551,160 A * | 11/1985 | Frailey | .................... | C03B 37/03 65/480 |
| 5,108,678 A * | 4/1992 | Hirasaka | ................. | B29C 70/12 156/296 |
| 5,194,462 A * | 3/1993 | Hirasaka | ................. | B29C 70/12 428/299.4 |
| 5,527,609 A * | 6/1996 | Yabuki | .................... | C08G 73/22 428/359 |
| 5,529,652 A * | 6/1996 | Asai | .................... | B32B 38/1866 156/180 |
| 5,759,927 A * | 6/1998 | Meeker | ................. | B29C 70/502 442/334 |
| 5,970,837 A * | 10/1999 | Arterburn | ............... | C03B 37/16 29/40 |
| 6,094,791 A * | 8/2000 | Akase | ....................... | D02J 1/18 19/65 T |
| 6,598,814 B2 * | 7/2003 | Bascom | .................. | C03B 37/16 241/185.5 |
| 7,134,371 B2 * | 11/2006 | Jander | .................... | B65H 51/14 83/331 |
| 7,363,842 B1 * | 4/2008 | Kempski | ................. | C03B 37/16 83/111 |
| 7,424,842 B1 * | 9/2008 | Kempski | ................. | C03B 37/16 83/346 |
| 7,603,933 B2 * | 10/2009 | Kempski | .................. | D01G 1/04 83/13 |
| 8,684,293 B2 * | 4/2014 | Folk | ....................... | B65H 65/00 241/222 |
| 8,829,103 B2 * | 9/2014 | Konagai | .................. | C08J 5/042 428/35.7 |
| 9,353,231 B2 * | 5/2016 | Ohki | ........................ | C08J 5/042 |
| 9,487,431 B2 * | 11/2016 | Font | ........................ | C03B 37/16 |
| 9,580,568 B2 * | 2/2017 | Hagihara | .............. | B29C 43/222 |
| 10,201,905 B2 * | 2/2019 | Fram | ........................ | B26D 1/40 |
| 10,208,174 B2 * | 2/2019 | Sonoda | .................... | D04H 1/72 |
| 2011/0143110 A1 * | 6/2011 | Tsuchiya | ................... | C08J 5/24 428/213 |
| 2012/0208019 A1 * | 8/2012 | Sugiura | ..................... | C08F 8/32 428/367 |
| 2013/0317161 A1 * | 11/2013 | Konagai | ................. | B29C 70/12 524/495 |

FOREIGN PATENT DOCUMENTS

| | | |
|---|---|---|
| EP | 0 044 933 A2 | 2/1982 |
| EP | 1 741 812 A2 | 1/2007 |
| EP | 3 321 054 A1 | 5/2018 |
| JP | 52-150621 U | 11/1977 |
| JP | 53-90621 U | 7/1978 |
| JP | 1-272829 A | 10/1989 |
| JP | 2-288994 | 11/1990 |
| JP | 6-108319 | 4/1994 |
| JP | 8-144132 | 6/1996 |
| JP | 2002-370192 | 12/2002 |
| JP | 2005-171421 | 6/2005 |
| JP | 2009-62474 | 3/2009 |
| JP | 2009-114611 | 5/2009 |
| JP | 2009-114612 | 5/2009 |

OTHER PUBLICATIONS

Partial Supplementary European Search Report dated Oct. 26, 2018 in Patent Application No. 16857466.3, 13 pages.
International Search Report dated Jan. 17, 2017 in PCT/JP2016/080953, filed on Oct. 19, 2016 (with English Translation).
Partial Supplementary European Search Report dated Aug. 26, 2018 in Patent Application No. 16857466.3. 13 pages.
Combined Chinese Office Action and Search Report dated Dec. 13, 2019 in Chinese Patent Application No. 201680059422.3, 18 pages (with unedited computer generated English translation).
Chinese Office Action dated Jul. 24, 2020, in Chinese Patent Application No. 201680059422.3 (with English Translation).
Office Action in corresponding European Application No. 16857466.3 dated May 4, 2020.
Office Action in corresponding European Application No. 16857466.3, dated Nov. 20, 2020.
Office Action in corresponding in Chinese Application No. 201680059422.3, dated Dec. 18, 2020. (w/Partial Machine Translation).

* cited by examiner

PRODUCING DEVICE AND PRODUCING METHOD FOR CHOPPED FIBER BUNDLES, PRODUCING DEVICE AND PRODUCING METHOD FOR FIBER-REINFORCED RESIN FORMING MATERIALS, CUTTING BLADE FOR CARBON FIBER BUNDLES, AND ROTARY CUTTER FOR CARBON FIBER BUNDLES

The present application is a continuation application of International Application No. PCT/JP2016/080953, filed on Oct. 19, 2016, which claims priority to Japanese Patent Application No. 2015-207482, filed on Oct. 21, 2015, Japanese Patent Application No. 2015-217457, filed on Nov. 5, 2015, and Japanese Patent Application No. 2016-058807, filed on Mar. 23, 2016, the contents of which are incorporated herein by reference.

TECHNICAL FIELD

The present invention relates to a producing device for chopped fiber bundles (a producing device for chopped carbon fiber bundles, a cutter), a producing method for chopped fiber bundles, a producing device for fiber-reinforced resin forming materials (fiber-reinforced resin materials), a producing method for fiber-reinforced resin forming materials (fiber-reinforced resin materials), a cutting blade for carbon fiber bundles, and a rotary cutter (cutter roller) for carbon fiber bundles.

BACKGROUND ART

Fiber-reinforced composite material moldings are used for various purposes, such as transportation equipment (vehicles (an automobile, a railroad vehicle, and the like), aircrafts, and the like), building components, and electronic devices. Accordingly, it is desirable that complicated shapes, such as an uneven shape and a deep drawing shape, can be applied to the fiber-reinforced composite material moldings.

For example, the following sheet-like fiber-reinforced resin forming materials, which have a property to easily flowing during the molding using a mold, are known as intermediate materials suitable for the production of complicated-shaped fiber-reinforced composite material moldings that include a portion of which the thickness partially varies, a rib, a boss, and the like.

- SMC (Sheet molding compound) in which a matrix resin composition containing a thermosetting resin, such as an unsaturated polyester resin, is impregnated into chopped fiber bundles that are obtained by cutting long fiber bundles formed of reinforcing fibers (carbon fibers, glass fibers, and the like) to a short length.
- A stampable sheet in which a matrix resin composition containing a thermoplastic resin is impregnated into chopped fiber bundles that are obtained by cutting long fiber bundles formed of reinforcing fibers (carbon fibers, glass fibers, and the like) to a short length.

Chopped fiber bundles included in fiber-reinforced resin forming materials (hereinafter, referred to as fiber-reinforced resin materials) are produced by, for example, the following method.

A method (for example, see Patent Literature 1 and Patent Literature 2) including: supplying long fiber bundles to a chopper unit (cutting means) (hereinafter, referred to as a cutter) including a rotary cutter (hereinafter, referred to as a cutter roller) where a plurality of cutting blades (hereinafter, simply referred to as blades) are mounted on the peripheral surface of a roller at intervals in the circumferential direction of the roller so that the direction of the rotation axis of the roller is substantially the same as the longitudinal direction of each cutting blade and an anvil roller (blade-receiving roller) (hereinafter, referred to as a rubber roller) that is adjacent to the rotary cutter; and obtaining chopped fiber bundles by cutting the long fiber bundles with the cutting blade of the rotary cutter while pushing the long fiber bundles against the anvil roller by the cutting blade of the rotary cutter.

Examples of a producing method for fiber-reinforced resin materials include the following method. Long fiber bundles, which are obtained by bundling a plurality of reinforcing fibers, are continuously cut by a cutter including a cutter roller which a plurality of blades are provided on the outer peripheral surface thereof and a rubber roller, and chopped fiber bundles, which have been cut, are dispersed in the shape of a sheet to form a sheet-like fiber bundle group. Then, a matrix resin composition is impregnated into the sheet-like fiber bundle group to form a fiber-reinforced resin material (for example, see Patent Literature 1 and Patent Literature 3).

CITATION LIST

Patent Literature

Patent Literature 1: JP 2009-114612 A
Patent Literature 2: German Patent Application Publication No. 102010018485
Patent Literature 3: JP 2009-62474 A

SUMMARY OF THE INVENTION

Problem to be Solved by the Invention

A plurality of long fiber bundles need to be supplied to the chopper unit at a high speed for the improvement of the productivity of chopped fiber bundles. However, in a case in which a plurality of long fiber bundles are made to travel at a high speed, adjacent fiber bundles are likely to overlap with each other during travel and to become thick. Since it is difficult to cut the long fiber bundles, which have become thick, by the cutting blade, chopped fiber bundles are likely to be in a connected state. When chopped fiber bundles, which are in a connected state, are contained in fiber-reinforced resin forming materials, the deviation of the direction of fibers contained in the fiber-reinforced resin forming materials is generated. Accordingly, anisotropy is generated in the strength of a fiber-reinforced composite material molding to be finally obtained. Further, since the flowability of the fiber-reinforced resin forming material during molding deteriorates when chopped fiber bundles, which are in a connected state, are contained in a fiber-reinforced resin forming material, the fiber-reinforced resin forming material cannot be molded in a desired shape. For this reason, usually, the travel direction of long fiber bundles to be supplied to the chopper unit is restricted by guide means (a comb-like guide, a groove-like guide, or the like) so that adjacent fiber bundles do not overlap with each other during travel.

However, since the travel positions of the fiber bundles are fixed in a case in which the travel direction of the long fiber bundles to be supplied to the chopper unit is restricted by the guide means, the positions of portions of the cutting blades, which come into contact with the fiber bundles, are also fixed. Further, the long fiber bundles, which come into contact with guide means, are likely to be folded in a width direction and to become thick. For this reason, since the portions of the cutting blades, which come into contact with the fiber bundles, are locally worn, there is a problem that the lifetime of the cutting blades is extremely shortened. When the lifetime of the cutting blade comes to an end, the long fiber bundles cannot be cut. Accordingly, eventually, a problem that chopped fiber bundles to be obtained are in a connected state, a problem that the deviation of the direction of fibers contained in the fiber-reinforced resin forming materials is generated, and a problem that anisotropy is generated in the strength of a fiber-reinforced composite material molding, and the like occur.

Furthermore, a plurality of long carbon fiber bundles need to be supplied to the chopper unit for the improvement of the productivity of chopped carbon fiber bundles. However, since a plurality of carbon fiber bundles arranged in parallel are simultaneously cut by one cutting blade in a case in which the direction of the rotation axis of the roller and the longitudinal direction of the cutting blade is set to the same direction, a large force is applied to the rotary cutter and the anvil roller at every cutting. Accordingly, since the application of the large force continuously occurs, the chopper unit is significantly vibrated and loud noise is generated.

A rotary cutter where a plurality of cutting blades are mounted at predetermined intervals in the circumferential direction of the roller so that the longitudinal direction of each cutting blade has an inclination (twist) with respect to the direction of the rotation axis of the roller is known as a rotary cutter of which the vibration generated at the time of cutting of a plurality of fiber bundles is suppressed (for example, see Patent Literature 2).

According to this rotary cutter, the respective fiber bundles of the plurality of fiber bundles arranged in parallel are cut in sequence toward a second end portion from a first end portion of one cutting blade. For this reason, since a large force is not applied to the rotary cutter and the anvil roller at every cutting, the vibration of the chopper unit is suppressed.

In the rotary cutter, grooves into which the cutting blades are fitted are formed in a spiral shape on the peripheral surface of the roller so that the longitudinal direction of each groove has an inclination (twist) with respect to the direction of the rotation axis of the roller. Accordingly, when the cutting blades are to be mounted in the spiral grooves formed on the peripheral surface of the roller, twist needs to be applied to the cutting blades. Further, the cutting blade is formed to be thin (specifically, a thickness is 0.7 mm or less) for the formation of a very small locally-bent shape for allowing the carbon fiber bundles as an aggregate of carbon fibers, which have a thickness of about 10 μm or less, to be cut and is formed to be long (specifically, a thickness is 300 mm or more) for the improvement of the productivity of chopped fiber bundles. For this reason, a cutting blade made of a steel material, which is not easily broken when twist is applied to the cutting blade even though the cutting blade is thin and long, is used as the cutting blade.

However, in a case in which carbon fiber bundles are cut by a cutting blade made of a steel material, there is a problem that the blade edge of the cutting blade is worn in a short time and the lifetime of the cutting blade is extremely shortened. Since the long fiber bundles cannot be cut when the lifetime of the cutting blade comes to an end, the cutting blade needs to be frequently replaced. For this reason, chopped carbon fiber bundles and fiber-reinforced resin forming materials cannot be continuously produced over a long time with high productivity.

Furthermore, in the cutter, the cutter roller and the rubber roller are rotated in directions opposite to each other while each blade of the cutter roller is pressed against the outer peripheral surface of the rubber roller, and continuously cut the fiber bundles while the fiber bundles are interposed between the cutter roller and the rubber roller. However, since the outer peripheral surface of the rubber roller is damaged due to continued use in the cutter in the related art, there is a concern that rubber scraps may be generated and may be mixed into fiber-reinforced resin materials to be produced.

A first mode of the invention provides a producing device and producing method for chopped fiber bundles in which the local wear of cutting blades is suppressed, and a producing device and producing method for fiber-reinforced resin forming materials in which the deviation of the direction of fibers is suppressed and which can stably produce fiber-reinforced resin forming materials over a long time.

A second mode of the invention provides: a cutting blade for carbon fiber bundles which is not easily broken even though twist is applied, of which a blade edge is not easily worn, and which is inexpensive; a rotary cutter for carbon fiber bundles of which cutting blades are not easily broken when the cutting blades are mounted, of which blade edges of the cutting blades are not easily worn, and which is inexpensive; a producing device for chopped carbon fiber bundles which can continuously produce chopped carbon fiber bundles over a long time with high productivity and of which vibration generated at the time of cutting of carbon fiber bundles is suppressed; and a producing device for fiber-reinforced resin forming materials which can continuously produce fiber-reinforced resin forming materials over a long time with high productivity.

A third mode of the invention provides a cutter roller, a cutter, and a producing device and producing method for fiber-reinforced resin materials that can suppress the generation of rubber scraps caused by damage to the outer peripheral surface of a rubber roller.

A fourth mode of the invention provides: a cutting blade that is excellent in durability, wear resistance, and mountability on a roller and is suitable to cut carbon fibers; and a producing device and producing method for chopped carbon fiber bundles that can continuously produce chopped carbon fiber bundles over a long time with high productivity.

Means for Solving Problem

The first mode of the invention relates to producing devices for chopped fiber bundles of <1> to <3>, producing methods for chopped fiber bundles of <4> to <6>, a producing device for fiber-reinforced resin forming materials of <7>, and a producing method for fiber-reinforced resin forming materials of <8>.

<1> A producing device for chopped fiber bundles including: cutting means including a cutting blade for cutting long fiber bundles; guide means (travel direction restricting means) for restricting the travel direction of the fiber bundles to be supplied to the cutting means; and widening means provided between the cutting means and the guide means and for widening the fiber bundles.

<2> The producing device for chopped fiber bundles of <1>, further including: one or both of first oscillating means for oscillating the guide means in a direction where the travel of the fiber bundles is restricted and second oscillating means for oscillating the cutting means in the direction where the travel of the fiber bundles is restricted.

<3> The producing device for chopped fiber bundles of <2>, wherein the first oscillating means oscillates the widening means so that the widening means is synchronized with the guide means.

<4> A producing method for chopped fiber bundles including: widening fiber bundles by widening means provided between the following cutting means and guide means while restricting the travel direction of the long fiber bundles to be supplied to the following cutting means by the guide means (travel direction restricting means); and obtaining chopped fiber bundles by cutting the fiber bundles with the cutting means including a cutting blade.

<5> The producing method for chopped fiber bundles of <4>, wherein the guide means and the cutting means are oscillated relative to each other in a direction where the travel of the fiber bundles is restricted.

<6> The producing method for chopped fiber bundles of <5>, wherein the widening means is oscillated in synchronization with the guide means.

<7> A producing device for fiber-reinforced resin forming materials including: the producing device for chopped fiber bundles of any one of <1> to <3>; and impregnation means for impregnating a matrix resin composition into chopped fiber bundles obtained by the producing device for chopped fiber bundles.

<8> A producing method for fiber-reinforced resin forming materials including: obtaining chopped fiber bundles by the producing method for chopped fiber bundles of any one of <4> to <6>; and impregnating a matrix resin composition into the chopped fiber bundles.

The second mode of the invention relates to cutting blades for carbon fiber bundles of <9> to <12>, a rotary cutter for carbon fiber bundles of <13>, a producing device for chopped carbon fiber bundles of <14>, and a producing device for fiber-reinforced resin forming materials of <15>.

<9> A cutting blade for carbon fiber bundles that is a flat blade-like cutting blade for carbon fiber bundles having a thickness of 0.7 mm or less and a length of 300 mm or more, the cutting blade for carbon fiber bundles including: a flat plate-shaped base portion that is made of a steel material; and a blade edge portion that is formed at a first side of the cutting blade for carbon fiber bundles formed along a longitudinal direction and is made of a steel material, wherein a blade angle of a tip of the blade edge portion is in the range of 25 to 50° and a coating layer made of at least one selected from a group consisting of titanium nitride, titanium carbide, and titanium carbonitride is provided on the surface of the blade edge portion, or the blade angle of the tip of the blade edge portion is in the range of 35 to 50° and the coating layer is not provided.

<10> The cutting blade for carbon fiber bundles of <9>, wherein the thickness of the cutting blade for carbon fiber bundles is in the range of 0.1 mm to 0.7 mm.

<11> The cutting blade for carbon fiber bundles of <9> or <10>, wherein a ratio (L/H) of the length L of the cutting blade for carbon fiber bundles to the height H of the cutting blade for carbon fiber bundles is larger than 11.

<12> The cutting blade for carbon fiber bundles of any one of <9> to <11>, wherein the thickness of the coating layer is larger than 1 μm.

<13> A rotary cutter for carbon fiber bundles including: a roller; and a plurality of cutting blades that are mounted on the peripheral surface of the roller at predetermined intervals in the circumferential direction of the roller so that the longitudinal direction of each cutting blade has an inclination with respect to the direction of a rotation axis of the roller, wherein each of the cutting blades is the cutting blade for carbon fiber bundles of any one of <9> to <12>.

<14> A producing device for chopped carbon fiber bundles including: the rotary cutter for carbon fiber bundles of <13>.

<15> A producing device for fiber-reinforced resin forming materials including: the producing device for chopped carbon fiber bundles of <14>; and impregnation means for impregnating a matrix resin composition into chopped carbon fiber bundles obtained by the producing device for chopped carbon fiber bundles.

The third mode of the invention relates to a cutter roller of <16>, a cutter of <17>, a producing device for fiber-reinforced resin materials of <18>, and a producing method for fiber-reinforced resin materials of <19>.

<16> A cutter roller that includes a roller body and a plurality of flat plate-shaped blades provided on the outer peripheral surface of the roller body, makes long fiber bundles be interposed between a rubber roller and itself while pressing the blade against the outer peripheral surface of the rubber roller, and cuts the fiber bundles, wherein a tip surface, which is flat and is perpendicular to the height direction of the blade, is formed at the tip of each blade.

<17> A cutter including: the cutter roller of <16>; and a rubber roller, wherein the cutter roller and the rubber roller are rotated in directions opposite to each other while each blade of the cutter roller is pressed against the outer peripheral surface of the rubber roller, and continuously cut long fiber bundles while the long fiber bundles are interposed between the cutter roller and the rubber roller.

<18> A producing device for fiber-reinforced resin materials including: the cutter of <17>; and a impregnation unit that impregnates a matrix resin composition into a sheet-like fiber bundle group formed of fiber bundles cut by the cutter.

<19> A producing method for fiber-reinforced resin materials including: a dispersion step of forming a sheet-like fiber bundle group by continuously cutting long fiber bundles with the cutter <17> and dispersing a plurality of cut fiber bundles on a first resin sheet, which is made of a matrix resin composition, in the shape of a sheet; and an impregnation step of obtaining a fiber-reinforced resin material by laminating a second resin sheet, which is made of a matrix resin composition, to the sheet-like fiber bundle group to form a material precursor, applying pressure to the material precursor from both surfaces, and impregnating the matrix resin composition into the sheet-like fiber bundle group.

The fourth mode of the invention relates to cutting blades for carbon fiber bundles of <20> to <25>, a producing device for chopped fiber bundles of <26>, and a producing method for chopped fiber bundles of <27>.

<20> A cutting blade for carbon fiber bundles in which a ratio ($\theta$/T) of a blade angle $\theta$ (°) to the thickness T (mm) of the blade is in the range of 35 to 1800.

<21> The cutting blade for carbon fiber bundles of <20> that is a flat blade-like cutting blade for carbon fiber bundles in which the $\theta$/T is in the range of 35 to 500, including: a flat plate-shaped base portion that is made of a steel material; and a blade edge portion that is formed at a first side of the cutting blade for carbon fiber bundles formed along a longitudinal direction and is made of a steel material, wherein a coating layer made of at least one selected from a group consisting of titanium nitride, titanium carbide, and titanium carbonitride is provided on the surface of the blade edge portion.

<22> The cutting blade for carbon fiber bundles of <21>, wherein the blade angle $\theta$ is in the range of 25 to 50°.

<23> The cutting blade for carbon fiber bundles of <20> that is a flat blade-like cutting blade for carbon fiber bundles in which the θ/T is in the range of 50 to 500, including: a flat plate-shaped base portion that is made of a steel material; and a blade edge portion that is formed at a first side of the cutting blade for carbon fiber bundles formed along a longitudinal direction and is made of a steel material, wherein a coating layer is not provided on the surface of the blade edge portion.

<24> The cutting blade for carbon fiber bundles of <23>, wherein the blade angle θ is in the range of 35 to 50°.

<25> The cutting blade for carbon fiber bundles of <20> that is a flat plate-shaped blade in which the θ/T is in the range of 500 to 1800, wherein a tip surface, which is flat and is perpendicular to the height direction of the blade, is formed at the tip of the blade.

<26> A producing device for chopped fiber bundles, including: the cutting blade for carbon fiber bundles of any one of <20> to <25>.

<27> A producing method for chopped fiber bundles, including: cutting fiber bundles by the cutting blade for carbon fiber bundles of any one of <20> to <25>.

Effect of the Invention

According to the producing device and producing method for chopped fiber bundles of the first mode of the invention, the local wear of the cutting blades is suppressed.

According to the producing device and producing method for fiber-reinforced resin forming materials of the first mode of the invention, fiber-reinforced resin forming materials of which the deviation of the direction of fibers is suppressed can be stably produced over a long time.

The cutting blade for carbon fiber bundles according to the second mode of the invention is not easily broken even though twist is applied to the cutting blade, the blade edge of the cutting blade is not easily worn, and the cutting blade is inexpensive.

The cutting blades are not easily broken when being mounted on the rotary cutter for carbon fiber bundles according to the second mode of the invention, the blade edges of the cutting blades are not easily worn, and the rotary cutter for carbon fiber bundles according to the second mode of the invention is inexpensive.

The producing device for chopped carbon fiber bundles according to the second mode of the invention can continuously produce chopped carbon fiber bundles over a long time with high productivity, and the vibration of the producing device at the time of cutting of carbon fiber bundles is suppressed.

The producing device for fiber-reinforced resin forming materials according to the second mode of the invention can continuously produce fiber-reinforced resin forming materials over a long time with high productivity.

The cutter roller according to the third mode of the invention can suppress the generation of rubber scraps caused by damage to the outer peripheral surface of the rubber roller.

The cutter according to the third mode of the invention can suppress the generation of rubber scraps caused by damage to the outer peripheral surface of the rubber roller.

When the producing device for fiber-reinforced resin materials according to the third mode of the invention is used, it is possible to produce fiber-reinforced resin materials while suppressing the generation of rubber scraps caused by damage to the outer peripheral surface of the rubber roller.

According to the producing method for fiber-reinforced resin materials of the third mode of the invention, it is possible to produce fiber-reinforced resin materials while suppressing the generation of rubber scraps caused by damage to the outer peripheral surface of the rubber roller.

The cutting blade for carbon fiber bundles according to the fourth mode of the invention is excellent in durability, wear resistance, and mountability on a roller.

According to the producing device and producing method for chopped carbon fiber bundles according to the fourth mode of the invention, it is possible to continuously produce chopped carbon fiber bundles over a long time with high productivity.

MODES FOR CARRYING OUT THE INVENTION

Figure 1:
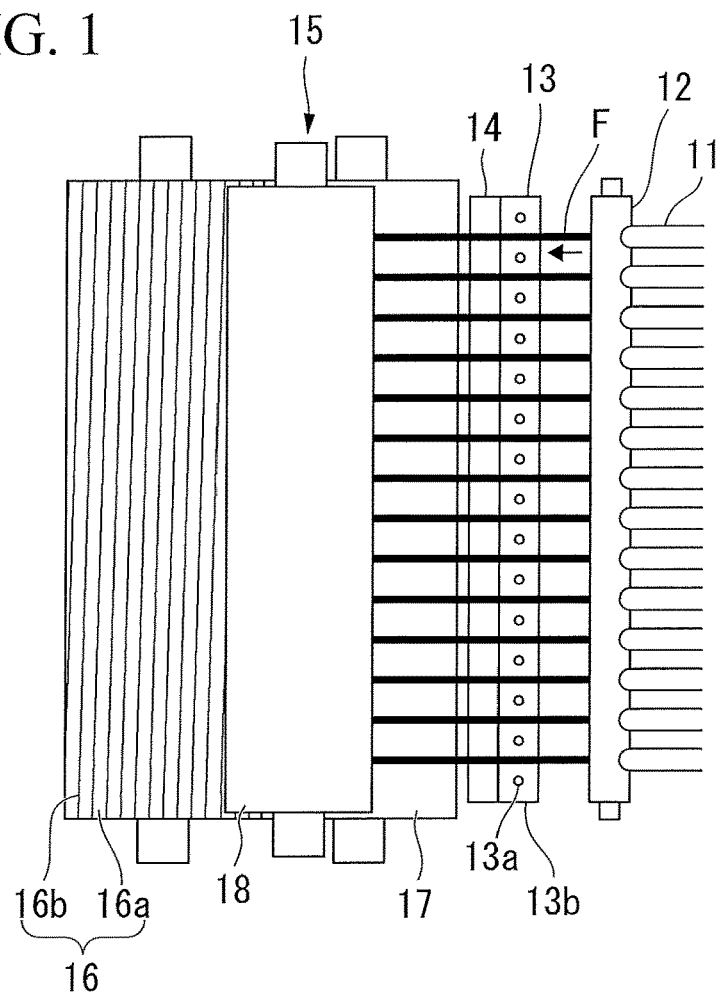
FIG. 1 is a top view illustrating an embodiment of a producing device for chopped fiber bundles according to a first mode of the invention.

The definition of the following terms is applied to this specification and claims.

"A direction in which the travel of fiber bundles is restricted" means a direction in which the movement of fiber bundles, which are traveling in a predetermined direction, relative to guide means is restricted by the guide means, among directions crossing a travel direction.

"Oscillation" means reciprocation in a predetermined direction with a predetermined moving width.

"Thickness" means the thickness of the thickest portion of a cutting blade.

"Blade angle" means an angle between a first surface and a second surface of a blade edge portion.

"Height" means a distance between a first side (the tip of the blade edge portion) of the cutting blade in a longitudinal direction and a second side of the cutting blade in the longitudinal direction.

For convenience of description, proportions in FIGS. 1 to 17 and FIG. 22 are different from actual proportions. Further, in FIGS. 1 to 17 and FIG. 22, the same components are denoted by the same reference numerals and the description thereof will be omitted.

First Mode of the Invention

First Embodiment (Producing Device for Chopped Fiber Bundles)

Figure 2:
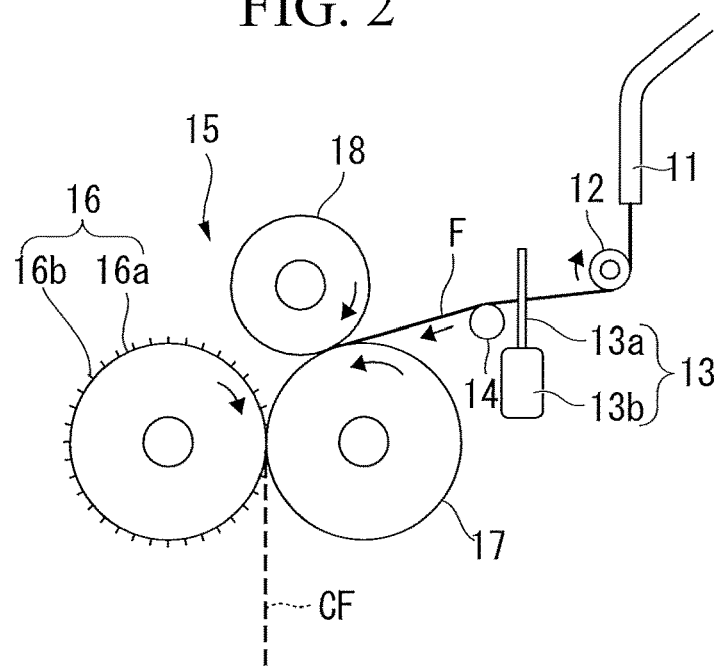
FIG. 2 is a side view of the producing device for chopped fiber bundles of FIG. 1.

FIG. 1 is a top view illustrating a first embodiment of a producing device for chopped fiber bundles according to a first mode of the invention, and FIG. 2 is a side view of the producing device for chopped fiber bundles of FIG. 1.

The first embodiment of the producing device for chopped fiber bundles according to the first mode of the invention includes: a plurality of supply hoses 11 (guide means) that discharge long fiber bundles F, which are supplied from the outside, downward; a guide roller 12 that guides the fiber bundles F, which are discharged from the supply hoses 11, in a substantially horizontal direction; a comb guide 13 (guide means) that is provided on the downstream side of the guide roller 12 and restricts the travel direction of the fiber bundles F; a scratch bar 14 (widening means) that is provided on the downstream side of the comb guide 13 and widens the fiber bundles F by coming into contact with the fiber bundles F; and a chopper unit 15 (cutting means) that is provided on the downstream side of the scratch bar 14 and cuts the fiber bundles F while drawing the fiber bundles F.

The chopper unit 15 includes a rotary cutter 16, an anvil roller 17 (blade-receiving roller) that is positioned on the upstream side of the rotary cutter 16 in the travel direction of the fiber bundles F and is adjacent to the rotary cutter 16, and a touch roller 18 that is positioned on the upstream side of the rotary cutter 16 in the travel direction of the fiber bundles F and is adjacent to the anvil roller 17.

The directions of the rotation axes of the guide roller 12, the rotary cutter 16, the anvil roller 17, and the touch roller 18 are parallel to the longitudinal directions of the comb guide 13 and the scratch bar 14. Further, each of the directions of the rotation axes and the longitudinal directions is a direction crossing (orthogonal to) a vertical direction and a direction crossing (orthogonal to) the travel direction of the fiber bundles F.

The guide roller 12, the rotary cutter 16, the anvil roller 17, and the touch roller 18 are rotated about the rotation axes so that portions thereof coming into contact with the fiber bundles F are moved in the same direction as the travel direction of the fiber bundles F. Accordingly, the rotary cutter 16 and the anvil roller 17 are rotated in directions opposite to each other, and the anvil roller 17 and the touch roller 18 are rotated in directions opposite to each other.

The comb guide 13 includes a plurality of rods 13a that extend in the vertical direction so as to restrict the movement of the fiber bundles F relative to the comb guide 13 in the direction crossing (orthogonal to) the vertical direction and the direction crossing (orthogonal to) the travel direction of the fiber bundles F, and a base 13b that supports one end portion of each rod 13a so that the rods 13a are arranged at predetermined intervals in the direction crossing (orthogonal to) the vertical direction and the direction crossing (orthogonal to) the travel direction of the fiber bundles F. An interval between the rods 13a and 13a is equal to an interval between the fiber bundles F and F.

The scratch bar 14 is a cylindrical bar that widens the fiber bundles F, which are to be scratched, by using frictional resistance. Plating (chrome plating or the like) is performed on the peripheral surface of the scratch bar 14 so that the scratch bar 14 has durability against friction between the fiber bundles F and itself. The scratch bar 14 is not rotated in the circumferential direction and is fixed at a position where the scratch bar 14 slightly raises the fiber bundles F so that the fiber bundles F traveling to the chopper unit 15 from the comb guide 13 are sufficiently scratched.

The rotary cutter 16 is a rotary cutter where a plurality of cutting blades 16b are mounted on the peripheral surface of a roller 16a at predetermined intervals in the circumferential direction of the roller 16a so that the longitudinal direction of each cutting blade slightly has an inclination (twist) with respect to the direction of the rotation axis of the roller 16a.

The roller 16a is made of metal (stainless steel or the like). Grooves into which the cutting blades 16b are fitted are formed in a spiral shape on the peripheral surface of the roller 16a so that the longitudinal direction of each groove slightly has an inclination (twist) with respect to the direction of the rotation axis of the roller.

Each cutting blade 16b is a flat plate-shaped flat blade, and includes a flat plate-shaped base portion that is to be fitted into the groove of the roller 16a and a blade edge portion that is formed at one side of the base portion formed along a longitudinal direction.

Examples of the material of the cutting blade 16b include a steel material, cemented carbide, and the like. In terms of the fact that it is difficult for the cutting blades 16b made of a steel material to be broken even though twist is applied to the cutting blades 16b are twisted when being mounted in the spiral grooves formed on the peripheral surface of the roller 16a and a steel material is inexpensive, it is preferable that a steel material is used as the material of the cutting blade 16b. Examples of the steel material include steel materials (a carbon tool steel material (SK) of JIS G 4401: 2009, a high speed tool steel material (SKH) of JIS G 4403:2006, alloy tool steel materials (SKS, SKD, SKT) of JIS G 4404:2006, and the like) specified as tool steel in Japanese Industrial Standard (JIS), stainless steel, and the like.

An interval between the cutting blades 16b and 16b in the circumferential direction of the roller 16a is set to be equal to the length of a chopped fiber bundle CF. An interval between the cutting blades 16b and 16b, that is, the length of a chopped fiber bundle CF is usually in the range of 5 to 100 mm and is preferably in the range of 10 to 55 mm.

It is preferable that the inclination (twist) of the longitudinal direction of each cutting blade 16b with respect to the direction of the rotation axis of the roller 16a is set so that the position of a second end portion of the cutting blade 16b in the circumferential direction is the same as the position of a first end portion of the cutting blade 16b adjacent to the position of the second end portion in the circumferential direction. Since a plurality of fiber bundles F arranged in parallel are simultaneously cut by one cutting blade 16b in a case in which the longitudinal direction of the cutting blade 16b is set to the same direction as the direction of the rotation axis of the roller, a large force is applied to the rotary cutter 16 and the anvil roller 17 at every cutting. Accordingly, since the application of the large force continuously occurs, the chopper unit 15 is significantly vibrated and loud noise is generated. On the other hand, since each cutting blade 16b is mounted so that the position of a second end portion of a cutting blade 16b in the circumferential direction is the same as the position of a first end portion of a cutting blade 16b adjacent to the position of the second end portion in the circumferential direction and the longitudinal direction of each cutting blade has an inclination (twist) with respect to the direction of the rotation axis of the roller 16a, the respective fiber bundles F of the plurality of fiber bundles F arranged in parallel are cut in sequence toward the second end portion from the first end portion of one cutting blade 16b and cutting using a cutting blade 16b adjacent to one cutting blade 16b is started after the cutting using one cutting blade 16b is completed. For this reason, since a large force is not applied to the rotary cutter 16 and the anvil roller 17 at every cutting, the vibration of the chopper unit 15 is suppressed.

In terms of the fact that the inclination (twist) of the longitudinal direction of each cutting blade 16b with respect to the direction of the rotation axis of the roller 16a can be reduced and the fact that the productivity of chopped fiber bundles CF is improved since many fiber bundles F can be cut at one time, the length of the cutting blade 16b is preferably 300 mm or more and more preferably 500 mm or more. In terms of the handleability (a difficulty in breakage) of the cutting blade 16b, the length of the cutting blade 16b is preferably 2000 mm or less and more preferably 1800 mm or less.

The anvil roller 17 is a roller where a rubber member for receiving the cutting blades 16b of the rotary cutter 16 is provided on the peripheral surface. Examples of the material of the rubber member include synthetic rubber (urethane rubber, nitrile rubber, neoprene rubber, and the like) and the like.

(Producing Method for Chopped Fiber Bundles)

A first embodiment of a producing method for chopped fiber bundles, which uses the producing device for chopped fiber bundles illustrated in FIGS. 1 and 2, will be described.

When the anvil roller 17 and the touch roller 18 are rotated in directions opposite to each other while long fiber bundles F are interposed between the anvil roller 17 and the touch roller 18, fiber bundles F are drawn out of external fiber bundle supply means (not illustrated) and are drawn into the chopper unit 15 via the supply hoses 11, the guide roller 12, the comb guide 13, and the scratch bar 14. In this way, the fiber bundles F are made to travel toward the chopper unit 15 from the external fiber bundle supply means.

After the long fiber bundles F supplied from the outside are discharged downward from the plurality of supply hoses 11 (guide means), the long fiber bundles F are guided in a substantially horizontal direction by the guide roller 12.

Each of the long fiber bundles F, which are guided in a substantially horizontal direction by the guide roller 12, is made to pass between the rods 13a and 13a of the comb guide 13 (guide means). In the comb guide 13, the plurality of of rods 13a extending in the vertical direction are arranged at the same interval as the interval between the fiber bundles F and F in the direction crossing (orthogonal to) the vertical direction and the direction crossing (orthogonal to) the travel direction of the fiber bundles F. Accordingly, the movement of the fiber bundles F relative to the comb guide 13 in the direction crossing (orthogonal to) the vertical direction and the direction crossing (orthogonal to) the travel direction of the fiber bundles F is restricted by the rods 13a.

Figure 3:
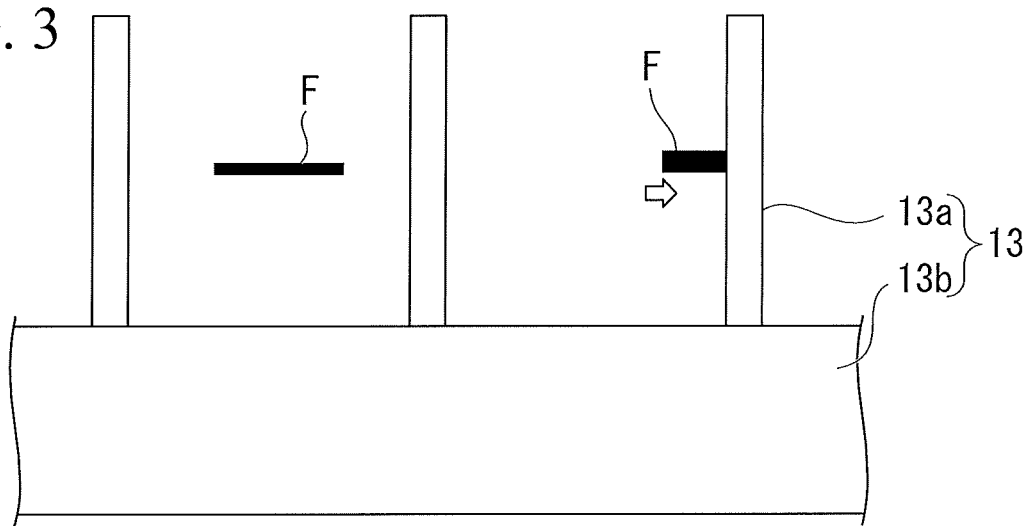
FIG. 3 is a diagram illustrating a comb guide of the producing device for chopped fiber bundles of FIG. 1 and fiber bundles that are viewed from the downstream side in the travel direction of fiber bundles.

Since the fiber bundles F are scratched by the scratch bar 14 (widening means) provided on the downstream side of the comb guide 13 while the travel direction of the long fiber bundles F is restricted by the comb guide 13 in this way, the scratch bar 14 widens the fiber bundles F by using frictional resistance. There is a case in which a part of the fiber bundles F come into contact with the rods 13a in the comb guide 13, are folded in a width direction, and become thick as illustrated in FIG. 3. The thick fiber bundles F are also widened by the scratch bar 14 and become sufficiently wide. Of course, usual fiber bundles F, which are not folded in the width direction, are also widened by the scratch bar 14 and become wider.

The long fiber bundles F, which are widened by the scratch bar 14 and are supplied to the chopper unit 15 (cutting means) by being interposed between the anvil roller 17 and the touch roller 18, are made to pass between the rotary cutter 16 and the anvil roller 17 while the rotary cutter 16 and the anvil roller 17 are rotated in directions opposite to each other. In this case, the fiber bundles F are cut by the cutting blades 16b of the rotary cutter 16 while being pushed against the anvil roller 17. Further, other portions of the fiber bundles F are cut by adjacent cutting blades 16b, so that chopped fiber bundles CF having the same length as the interval between the cutting blades 16b and 16b are obtained. The chopped fiber bundles CF fall down from a gap between the rotary cutter 16 and the anvil roller 17.

(Fiber Bundle)

Examples of the fiber bundle F include a flat-unidirectional reinforcing fiber bundle of which a plurality of reinforcing fibers are drawn in one direction and are aligned with each other, and the like.

The fiber bundle F may be a fiber bundle that has been treated with a sizing agent or the like.

Examples of the reinforcing fiber include an inorganic fiber, a metal fiber, an organic fiber, and the like.

Examples of the inorganic fiber include a carbon fiber, a graphitic fiber, a glass fiber, a silicon carbide fiber, a silicon nitride fiber, an alumina fiber, a silicon carbide fiber, a boron fiber, and the like.

Examples of the metal fiber include an aluminum fiber, a brass fiber, a stainless steel fiber, and the like.

Examples of the organic fiber include an aromatic polyamide fiber, a polyaramide fiber, a poly-p-phenylene benzoxazole (PBO) fiber, a polyphenylene sulfide fiber, a polyester fiber, an acrylic fiber, a nylon fiber, a polyethylene fiber, and the like.

The reinforcing fiber may be a fiber that has been subjected to surface treatment.

As the reinforcing fiber, one of the fibers may be used alone and two or more of the fibers may be used together.

In terms of the fact that hardness is high and the cutting blades 16*b* are likely to be worn, that is, the effect of the invention is sufficiently exhibited, it is preferable that a carbon fiber is used as the reinforcing fiber.

(Action Mechanism)

In the first embodiments of the producing device and producing method for chopped fiber bundles according to the first mode of the invention having been described above, the long fiber bundles F, which are widened by the scratch bar 14 (widening means), are cut by the chopper unit 15 (cutting means) including the cutting blades 16*b*. Accordingly, since the width of a portion of the cutting blade 16*b*, which comes into contact with the fiber bundles F, is increased in comparison with a case in which the fiber bundles F, which are not widened, are cut, the local wear of the cutting blades 16*b* is relatively suppressed.

Second Embodiment (Producing Device for Chopped Fiber Bundles)

Figure 4:
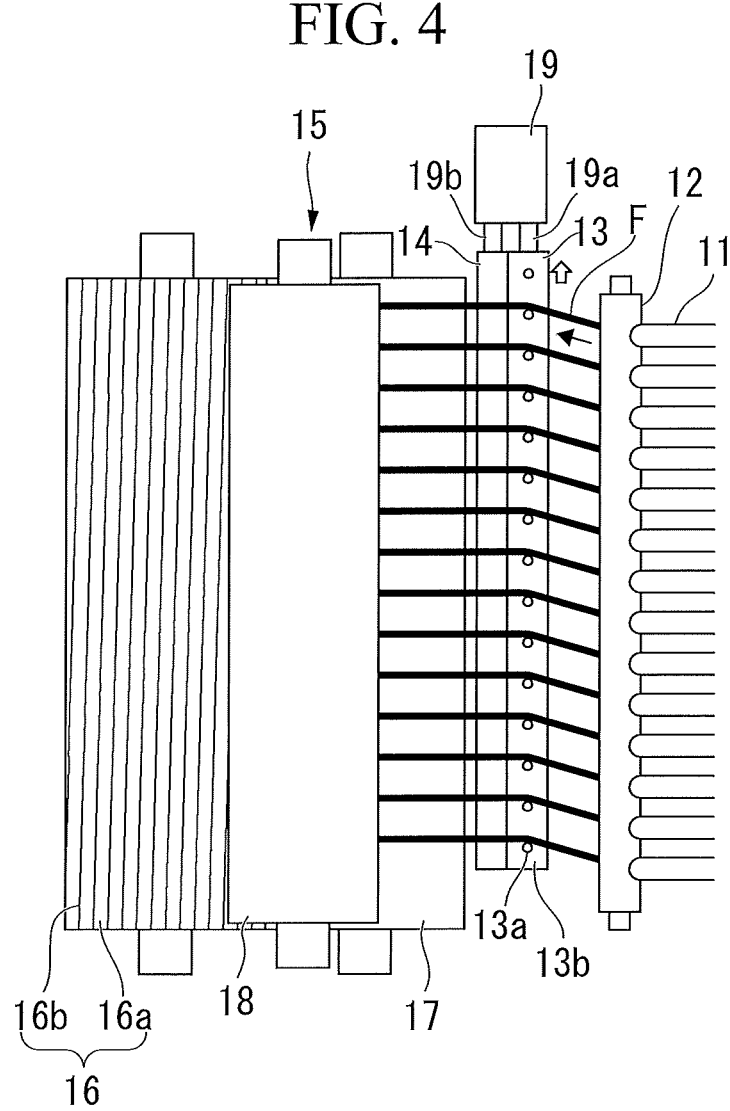
FIG. 4 is a top view illustrating another embodiment of the producing device for chopped fiber bundles according to the first mode of the invention.
Figure 5:
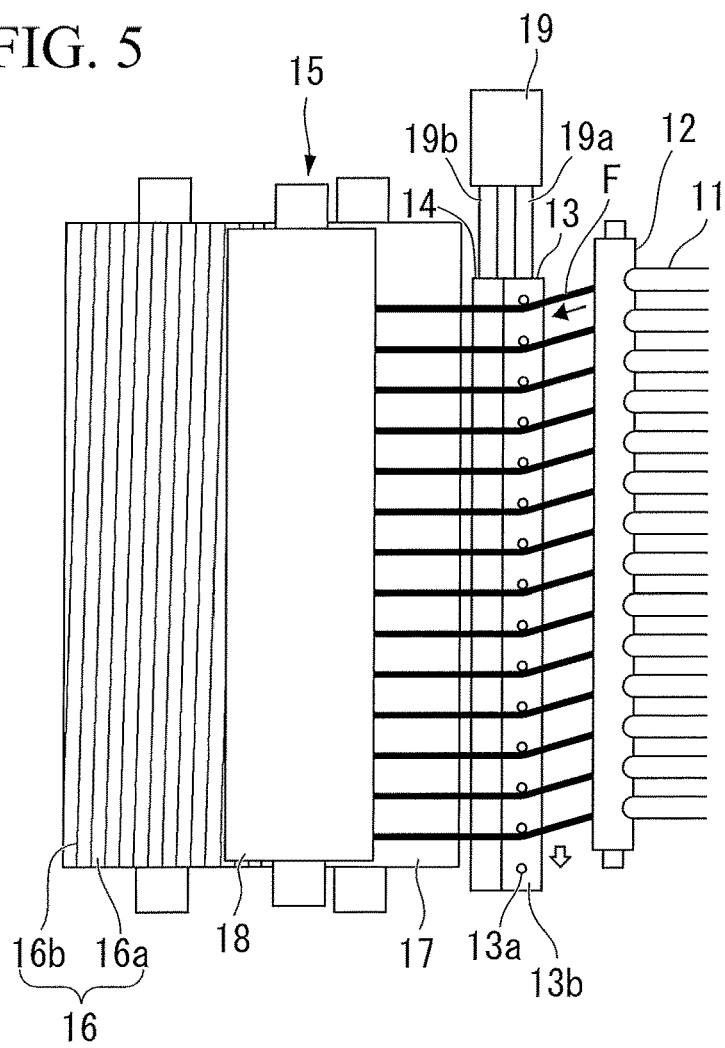
FIG. 5 is a top view illustrating an aspect where a comb guide and a scratch bar have been made to oscillate in the producing device for chopped fiber bundles of FIG. 4.

FIGS. 4 and 5 are top views illustrating a second embodiment of the producing device for chopped fiber bundles according to the first mode of the invention.

The second embodiment of the producing device for chopped fiber bundles according to the first mode of the invention includes an oscillating device 19 (first oscillating means) in addition to the first embodiment of the producing device for chopped fiber bundles. The oscillating device 19 (first oscillating means) oscillates the comb guide 13 (guide means) and the scratch bar 14 (widening means) in a direction where the travel of the fiber bundles F is restricted, that is, a direction crossing (orthogonal to) the vertical direction and a direction crossing (orthogonal to) the travel direction of the fiber bundles F so that the comb guide 13 and the scratch bar 14 are synchronized with each other.

Examples of an oscillating mechanism of the oscillating device 19 include a crank mechanism, a cylinder mechanism that uses air and electricity, and the like.

For example, the crank mechanism includes a crank (not illustrated) that is rotationally moved, a first connecting rod 19*a* of which a first end portion is connected to a rotating end of the crank and a second end portion is connected to an end portion of the base 13*b* of the comb guide 13, a second connecting rod 19*b* of which a first end portion is connected to the rotating end of the crank and a second end portion is connected to an end portion of the scratch bar 14, a first guide passage (not illustrated) that is provided along the longitudinal direction of the base 13*b* of the comb guide 13 so that the comb guide 13 can reciprocate, and a second guide passage (not illustrated) that is provided along the longitudinal direction of the scratch bar 14 so that the scratch bar 14 can reciprocate.

Since the comb guide 13 and the scratch bar 14 reciprocate through the rotational movement of one crank, the comb guide 13 and the scratch bar 14 reciprocate in the same direction and with the same period. That is, the comb guide 13 and the scratch bar 14 are oscillated in synchronization with each other.

(Producing Method for Chopped Fiber Bundles)

A second embodiment of a producing method for chopped fiber bundles, which uses the producing device for chopped fiber bundles illustrated in FIGS. 4 and 5, will be described.

When the anvil roller 17 and the touch roller 18 are rotated in directions opposite to each other while long fiber bundles F are interposed between the anvil roller 17 and the touch roller 18, fiber bundles F are drawn out of external fiber bundle supply means (not illustrated) and are drawn into the chopper unit 15 via the supply hoses 11, the guide roller 12, the comb guide 13, and the scratch bar 14. In this way, the fiber bundles F are made to travel toward the chopper unit 15 from the external fiber bundle supply means.

After the long fiber bundles F supplied from the outside are discharged downward from the plurality of supply hoses 11 (guide means), the long fiber bundles F are guided in a substantially horizontal direction by the guide roller 12.

Each of the long fiber bundles F, which are guided in a substantially horizontal direction by the guide roller 12, is made to pass between the rods 13*a* and 13*a* of the comb guide 13 (guide means). In the comb guide 13, the plurality of rods 13*a* extending in the vertical direction are arranged at the same interval as the interval between the fiber bundles F and F in the direction crossing (orthogonal to) the vertical direction and the direction crossing (orthogonal to) the travel direction of the fiber bundles F. Accordingly, the movement of the fiber bundles F relative to the comb guide 13 in the direction crossing (orthogonal to) the vertical direction and the direction crossing (orthogonal to) the travel direction of the fiber bundles F is restricted by the rods 13*a*.

Further, since the comb guide 13 is oscillated by the oscillating device 19 in the direction in which the travel of the fiber bundles F is restricted, that is, the direction crossing (orthogonal to) the vertical direction and the direction crossing (orthogonal to) the travel direction of the fiber bundles F as illustrated in FIGS. 4 and 5 while the movement of the fiber bundles F relative to the comb guide 13 in the direction crossing (orthogonal to) the vertical direction and the direction crossing (orthogonal to) the travel direction of the fiber bundles F is restricted, the travel positions of the fiber bundles F are oscillated in substantially the same direction as the longitudinal direction of the cutting blades 16*b*.

When the oscillation speed of the comb guide 13 is adjusted to control the oscillation period of the comb guide 13 so that the oscillation period of the comb guide 13 does not become too long, the travel positions of the fiber bundles F can be made to not easily deviate to specific portions. Accordingly, the local wear of the cutting blades 16*b* can be further suppressed. Further, when the oscillation speed of the comb guide 13 is adjusted to control the oscillation period of the comb guide 13 so that the oscillation period of the comb guide 13 does not become too short, the fiber bundles F can be made to not easily come into violent contact with the rods 13*a* that are being oscillated. Accordingly, the fiber bundles F can be made to be not easily folded in the width direction and to not easily become thick.

The comb guide 13 may be continuously oscillated and may be intermittently oscillated. In terms of the fact that it is difficult for the travel positions of the fiber bundles F to deviate to specific portions, it is preferable that the comb guide 13 is continuously oscillated. On the other hand, when the comb guide 13 is intermittently oscillated, it is preferable that time to stop the comb guide 13 is shortened. When the comb guide 13 is stopped over a long time, the cutting blades 16*b* are likely to locally wear. When the cutting blades 16*b* are locally worn once, the fiber bundles F are likely to pass through the locally worn portions of the fiber bundles F due to a wheel track effect even though the comb guide 13 is oscillated afterward. Accordingly, the local wear of the cutting blades 16*b* further progresses.

Figure 6:
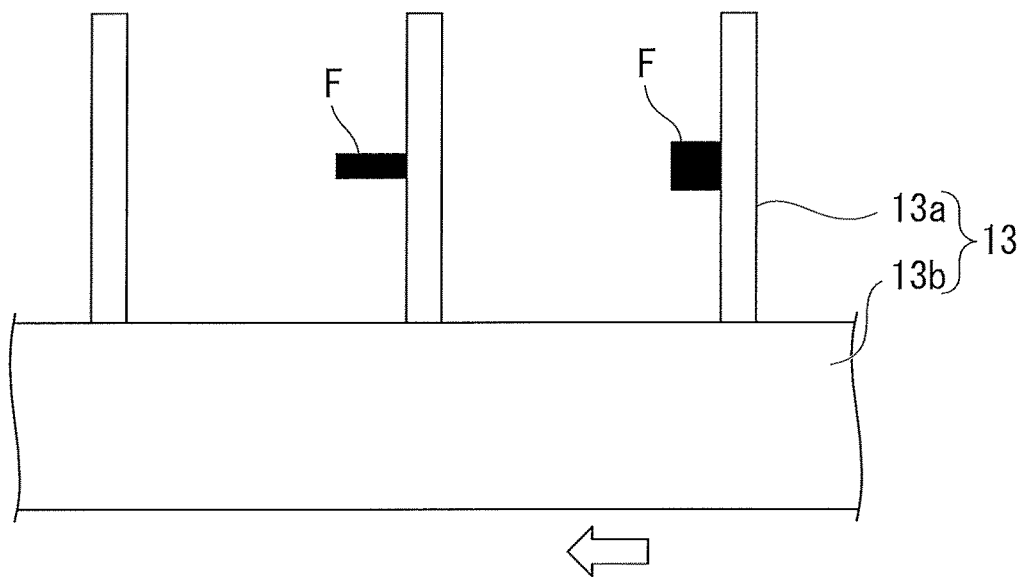
FIG. 6 is a diagram illustrating the comb guide of the producing device for chopped fiber bundles of FIG. 4 and fiber bundles that are viewed from the downstream side in the travel direction of fiber bundles.

Since the fiber bundles F are scratched by the scratch bar 14 (widening means) provided on the downstream side of the comb guide 13 while the travel positions of the long fiber bundles F are oscillated by the comb guide 13, the scratch bar 14 widens the fiber bundles F by using frictional resistance. As illustrated in FIG. 6, the fiber bundles F come into contact with the oscillating rod 13*a* in the comb guide 13, are folded in the width direction, and become thick. The thick fiber bundles F are also widened by the scratch bar 14 and become sufficiently wide.

Meanwhile, when the scratch bar 14 is not oscillated in synchronization with the comb guide 13, the fiber bundles F are also scratched in the longitudinal direction of the scratch bar 14. Accordingly, the fiber bundles F are folded in the longitudinal direction of the scratch bar 14, that is, the width direction of the fiber bundles F, and are likely to become thick. Accordingly, it is preferable that the scratch bar 14 is oscillated in synchronization with the comb guide 13.

The long fiber bundles F, which are widened by the scratch bar 14 and are supplied to the chopper unit 15 (cutting means) by being interposed between the anvil roller 17 and the touch roller 18, are made to pass between the rotary cutter 16 and the anvil roller 17 while the rotary cutter 16 and the anvil roller 17 are rotated in directions opposite to each other. In this case, the fiber bundles F are cut by the cutting blades 16*b* of the rotary cutter 16 while being pushed against the anvil roller 17. Further, other portions of the fiber bundles F are cut by adjacent cutting blades 16*b*, so that chopped fiber bundles CF having the same length as the interval between the cutting blades 16*b* and 16*b* are obtained. The chopped fiber bundles CF fall down from a gap between the rotary cutter 16 and the anvil roller 17.

(Action Mechanism)

In the second embodiments of the producing device and producing method for chopped fiber bundles according to the first mode of the invention having been described above, the comb guide 13 (guide means) is oscillated in the direction where the travel of the fiber bundles F is restricted, that is, the direction crossing (orthogonal to) the vertical direction and the direction crossing (orthogonal to) the travel direction of the fiber bundles F. For this reason, the travel positions of the fiber bundles F are oscillated in substantially the same direction as the longitudinal direction of the cutting blades 16*b* of the chopper unit 15 (cutting means). As a result, since the positions of portions of the cutting blades 16*b*, which come into contact with the fiber bundles F, are also oscillated, the cutting blades 16*b* are uniformly worn and the local wear of the cutting blades 16*b* is suppressed.

Further, the long fiber bundles F, which are widened by the scratch bar 14 (widening means), are cut by the chopper unit 15 including the cutting blades 16*b*. Accordingly, since the width of a portion of the cutting blade 16*b*, which comes into contact with the fiber bundles F, is increased in comparison with a case in which the fiber bundles F, which are not widened, are cut, the local wear of the cutting blades 16*b* is further suppressed.

Furthermore, since the scratch bar 14 is oscillated in synchronization with the comb guide 13, the folding of the fiber bundle F in the width direction and an increase in the thickness of the fiber bundle F are suppressed. For this reason, the local wear of the cutting blades 16*b* is further suppressed.

Moreover, since the local wear of the cutting blades 16*b* is suppressed over a long time, the generation of defective products in which the chopped fiber bundles CF are connected is suppressed over a long time.

Other Embodiments

The producing device for chopped fiber bundles according to the first mode of the invention may have only to include cutting means including cutting blades for cutting long fiber bundles, guide means for restricting the travel direction of the long fiber bundles to be supplied to the cutting means, and widening means provided between the cutting means and the guide means and widening the long fiber bundles to be supplied to the cutting means; and is not limited to the producing devices of the embodiments illustrated in the drawings.

Further, the producing method for chopped fiber bundles according to the first mode of the invention may have only to be a method including: widening fiber bundles by widening means provided between cutting means and guide means while restricting the travel direction of the long fiber bundles to be supplied to the cutting means by the guide means; and obtaining chopped fiber bundles by cutting the fiber bundles with cutting means including cutting blades. The producing method for chopped fiber bundles according to the first mode of the invention is not limited to methods that use the producing devices of the embodiments illustrated in the drawings.

For example, the guide means is not limited to the supply hoses 11 and the comb guide 13 of the embodiments illustrated in the drawings; and may be a comb-like guide other than the comb guide 13, a groove-like guide where grooves are formed on the surface of a square bar, a plate, a roller, or the like, and the like.

Further, the cutting means is not limited to the chopper unit 15 including the rotary cutter 16 of the embodiments illustrated in the drawings, and may be a chopper unit that includes a so-called guillotine cutter reciprocating a cutting blade in a vertical direction, and the like.

Furthermore, the widening means is not limited to the scratch bar, and may be air blowing means (air nozzle) and the like. Moreover, the scratch bar is not limited to a cylindrical bar.

Further, the comb guide 13, which is the guide means, can also be omitted. When the plurality of supply hoses 11, which are the guide means, are arranged at predetermined intervals even though the comb guide 13 is omitted, the travel direction of the fiber bundles F can be restricted. Furthermore, when the comb guide 13 is omitted in FIGS. 4 and 5, the plurality of supply hoses 11 and the scratch bar 14 can be oscillated in synchronization with each other. Accordingly, the local wear of the cutting blades 16*b* can be suppressed.

Moreover, the producing device for chopped fiber bundles of the invention is not limited to a device including oscillating means as in the second embodiment, and the oscillating means may be omitted as in the first embodiment.

Further, the guide means and the cutting means may have only to be oscillated relative to each other, and are not limited to an embodiment in which the guide means is oscillated by the first oscillating means and the cutting means is fixed as in the second embodiment.

For example, the guide means may be fixed and the cutting means may be oscillated by second oscillating means, and the guide means may be oscillated by the first oscillating means and the cutting means may be oscillated by the second oscillating means.

Furthermore, it is preferable that the widening means is oscillated in synchronization with the guide means as in the second embodiment. However, the widening means may be oscillated without being synchronized with the guide means, and may be fixed without being oscillated.

<Production of Fiber-Reinforced Resin Forming Materials>

(Producing Device for Fiber-Reinforced Resin Forming Materials)

Figure 7:
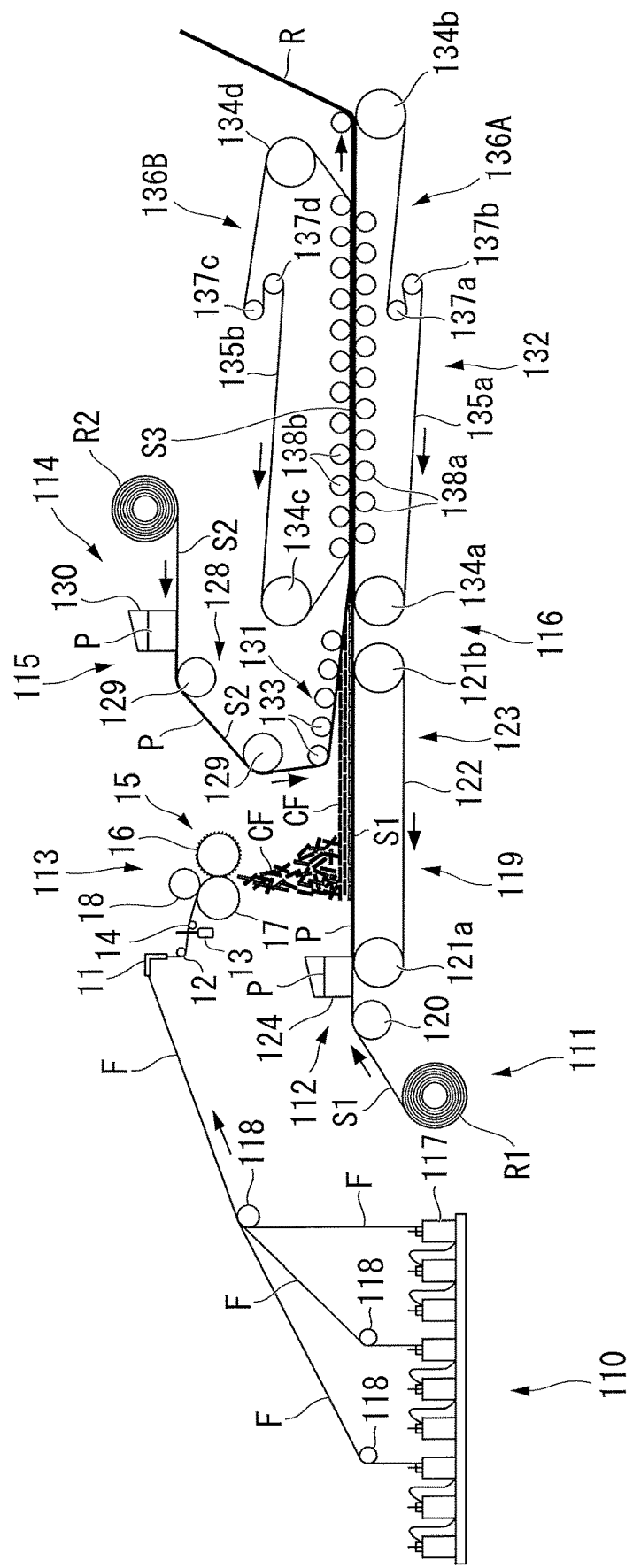
FIG. 7 is a side view illustrating an embodiment of a producing device for fiber-reinforced resin forming materials according to the first mode of the invention.

FIG. 7 is a side view illustrating an embodiment of a producing device for fiber-reinforced resin forming materials according to the first mode of the invention.

The producing device for fiber-reinforced resin forming materials includes fiber bundle supply means 110, first sheet supply means 111, first coating means 112, chopped fiber bundle-producing means 113, second sheet supply means 114, second coating means 115, and impregnation means 116.

The fiber bundle supply means 110 is to supply long fiber bundles F, which are drawn out of a plurality of bobbins 117, to the chopped fiber bundle-producing means 113 through a plurality of guide rollers 118.

The first sheet supply means 111 is to supply a long first release sheet S1, which is unwound from a first original fabric roll R1, to the first coating means 112. The first sheet supply means 111 includes a first conveying unit 119 that conveys the first release sheet S1 to the right side in FIG. 7.

The first conveying unit 119 includes a guide roller 120 and a conveyor 123 in which an endless belt 122 is suspended between a pair of pulleys 121a and 121b. The guide roller 120 is to guide the first release sheet S1, which is supplied from the first original fabric roll R1, to the conveyor 123 while being rotated. The conveyor 123 is to convey the first release sheet S1 to the right side in FIG. 7 on the surface of the endless belt 122 while turning the endless belt 122 by rotating the pair of pulleys 121a and 121b in the same direction.

The first coating means 112 is positioned directly above one pulley 121a close to the guide roller 120 and includes a supply box 124 that supplies paste P made of a matrix resin composition. The supply box 124 is to coat the surface of the first release sheet S1, which is conveyed by the conveyor 123, with the paste P, which is supplied from a slit (not illustrated) formed at the bottom of the supply box 124, with a predetermined thickness.

The chopped fiber bundle-producing means 113 is the producing device for chopped fiber bundles of the invention.

The chopped fiber bundle-producing means 113 is positioned on the downstream side of the first coating means 112 in the conveying direction of the first release sheet S1, and is to disperse chopped fiber bundles CF, which are obtained by cutting fiber bundles F supplied from the fiber bundle supply means 110 with the chopper unit 15, on the paste P of the first release sheet S1 that is conveyed by the conveyor 123.

The second sheet supply means 114 is to supply a long second release sheet S2, which is unwound from a second original fabric roll R2, to the second coating means 115. The second sheet supply means 114 includes a second conveying unit 128 that conveys the second release sheet S2 to the impregnation means 116.

The second conveying unit 128 is positioned above the first release sheet S1 that is conveyed by the conveyor 123, and includes a plurality of guide rollers 129. After the second conveying unit 128 conveys the second release sheet S2, which is supplied from the second original fabric roll R2, to the left side in FIG. 7, the second conveying unit 128 inverts the conveying direction of the second release sheet S2 to the right side in FIG. 7 from the lower side by the plurality of rotating guide rollers 129.

The second coating means 115 is positioned directly above the second release sheet S2, which is conveyed to the left side in FIG. 7, and includes a supply box 130 that supplies paste P made of a matrix resin composition.

The supply box 130 is to coat the surface of the second release sheet S2 with the paste P, which is supplied from a slit (not illustrated) formed at the bottom of the supply box 130, with a predetermined thickness.

The impregnation means 116 is positioned on the downstream side of the chopped fiber bundle-producing means 113 in the conveying direction of the first release sheet S1, and includes a bonding mechanism 131 and a pressure applying mechanism 132.

The bonding mechanism 131 is positioned above the other pulley 121b of the conveyor 123 and includes a plurality of bonding rollers 133.

The plurality of bonding rollers 133 are arranged side by side in the conveying direction of the second release sheet S2 in a state in which the plurality of bonding rollers 133 are in contact with the back of the second release sheet S2 coated with the paste P. Further, the plurality of bonding rollers 133 are arranged so that the second release sheet S2 gradually approaches the first release sheet S1.

The bonding mechanism 131 is to superimpose the second release sheet S2 on the first release sheet S1 and to convey the first and second release sheets S1 and S2 to the pressure applying mechanism 132 in a state in which the first and second release sheets S1 and S2 are bonded to each other while the chopped fiber bundles CF and the paste P are interposed between the first and second release sheets S1 and S2. Hereinafter, the first and second release sheets S1 and S2, which are bonded to each other with the chopped fiber bundles CF and the paste P interposed therebetween, are referred to as a bonded sheet S3.

The pressure applying mechanism 132 is positioned on the downstream side of the first conveying unit 119 (conveyor 123), and includes a lower conveyor 136A in which an endless belt 135a is suspended between a pair of pulleys 134a and 134b and an upper conveyor 136B in which an endless belt 135b is suspended between a pair of pulleys 134c and 134d. The lower and upper conveyors 136A and 136B are disposed so as to face each other in a state in which the endless belts 135a and 135b are pressed against each other.

The pressure applying mechanism 132 is to turn the endless belt 135a by rotating the pair of pulleys 134a and 134b of the lower conveyor 136A in the same direction and to turn the endless belt 135b at the same speed as the endless belt 135a and in a direction opposite to the endless belt 135a by rotating the pair of pulleys 134c and 134d of the upper conveyor 136B in the same direction. Accordingly, the bonded sheet S3, which is interposed between the endless belts 135a and 135b, is conveyed to the right side in FIG. 7.

A pair of tension pulleys 137a and 137b, which is used to adjust tension applied to the endless belt 135a, is disposed in the lower conveyor 136A. Likewise, a pair of tension pulleys 137c and 137d, which is used to adjust tension applied to the endless belt 135b, is disposed in the upper conveyor 136B. These tension pulleys 137a, 137b, 137c, and 137d are provided on the sides of the endless belts 135a and 135b opposite to the pressed portions of the endless belts 135a and 135b.

The pressure applying mechanism 132 includes a plurality of lower rollers 138a and a plurality of upper rollers 138b. The plurality of lower rollers 138a are arranged side by side in the conveying direction in a state in which the plurality of lower roller 138a are in contact with the back of the pressed portion of the endless belt 135a. Likewise, the plurality of upper rollers 138b are arranged side by side in the conveying direction in a state in which the plurality of upper rollers 138b are in contact with the back of the pressed portion of the endless belt 135b. Further, the plurality of lower rollers 138a and the plurality of upper rollers 138b are arranged side by side alternately in the conveying direction of the bonded sheet S3.

The pressure applying mechanism 132 is to apply pressure to the paste P and the chopped fiber bundles CF, which are interposed between the first and second release sheets S1 and S2, by the plurality of lower rollers 138a and the plurality of upper rollers 138b while the bonded sheet S3 passes between the endless belts 135a and 135b.

(Producing Method for Fiber-Reinforced Resin Forming Materials)

A producing method for fiber-reinforced resin forming materials, which uses the producing device for fiber-reinforced resin forming materials illustrated in FIG. 7, will be described.

When the anvil roller 17 and the touch roller 18 are rotated in directions opposite to each other while long fiber bundles F are interposed between the anvil roller 17 and the touch roller 18 of the chopped fiber bundle-producing means 113, fiber bundles F are drawn out of the fiber bundle supply means 110 and are supplied to the chopped fiber bundle-producing means 113 through the plurality of guide rollers 118.

When the conveyor 123 of the first conveying unit 119 of the first sheet supply means 111 is driven, the long first release sheet S1, which is unwound from the first original fabric roll R1, is supplied to the first coating means 112.

The paste P made of a matrix resin composition is supplied to the surface of the first release sheet S1, which is conveyed by the conveyor 123, from the supply box 124 of the first coating means 112, and the surface of the first release sheet S1 is coated with the paste P with a predetermined thickness.

The long fiber bundles F supplied from the fiber bundle supply means 110 are cut by the chopper unit 15 of the chopped fiber bundle-producing means 113, so that chopped fiber bundles CF are obtained. The chopped fiber bundles CF, which freely fall from the chopper unit 15, are dispersed on the paste P of the first release sheet S1 that is conveyed by the conveyor 123.

When the upper conveyor 136B of the pressure applying mechanism 132 of the impregnation means 116 is driven, the long second release sheet S2, which is unwound from the second original fabric roll R2 of the second sheet supply means 114, is supplied to the second coating means 115 through the second conveying unit 128.

The paste P made of a matrix resin composition is supplied to the surface of the second release sheet S2, which is conveyed to the left side in FIG. 7, from the supply box 130 of the second coating means 115, and the surface of the second release sheet S2 is coated with the paste P with a predetermined thickness.

The second release sheet S2 is superimposed on the first release sheet S1 and the chopped fiber bundles CF and the paste P are interposed between the first and second release sheets S1 and S2 by the bonding mechanism 131 of the impregnation means 116, so that the bonded sheet S3 is obtained.

When the lower and upper conveyors 136A and 136B of the pressure applying mechanism 132 of the impregnation means 116 are driven, pressure is applied to the paste P and the chopped fiber bundles CF, which are interposed between the first and second release sheets S1 and S2, by the plurality of lower rollers 138a and the plurality of upper rollers 138b while the bonded sheet S3 is conveyed to the right in FIG. 7. At this time, the paste P is impregnated into gaps between the chopped fiber bundles CF from both sides of the chopped fiber bundles CF.

In this way, an original fabric R of a fiber-reinforced resin forming material in which a thermosetting resin is impregnated into gaps between the chopped fiber bundles CF can be obtained. Further, when the original fabric R of a fiber-reinforced resin forming material is cut to a predetermined length, cut original fabrics R are finally shipped as sheet-like fiber-reinforced resin forming materials (SMC). Meanwhile, the first and second release sheets S1 and S2 are detached from the fiber-reinforced resin forming material before the formation of the fiber-reinforced resin forming material.

(Matrix Resin Composition)

A matrix resin composition includes a thermosetting resin.

Examples of the thermosetting resin include an unsaturated polyester resin, an epoxy resin, a vinylester resin, a polyimide resin, a maleimide resin, a phenolic resin, and the like.

The matrix resin composition may contain a filler (calcium carbonate or the like), a shrinkage reducing agent, a mold release agent, a hardening initiator, a thickener, and the like.

(Action Mechanism)

In the producing device and producing method for fiber-reinforced resin forming materials according to the first mode of the invention having been described above, chopped fiber bundles are obtained by the producing device and producing method for chopped fiber bundles according to the first mode of the invention. Accordingly, the generation of defective products in which the chopped fiber bundles are connected is suppressed over a long time. As a result, since it is difficult for a deviation to occur in the direction of fibers of the fiber-reinforced resin forming materials to be obtained, fiber-reinforced resin forming materials of which the deviation of the direction of fibers is suppressed can be stably produced over a long time. Further, it is difficult for anisotropy to occur in the strength of a fiber-reinforced composite material molding that is produced from the fiber-reinforced resin forming material. Furthermore, since the deterioration of flowability at the time of molding is suppressed, the material can be molded into a desired shape.

Other Embodiments

The producing device for fiber-reinforced resin forming materials according to the first mode of the invention may have only to include the producing device for chopped fiber bundles according to the first mode of the invention and the impregnation means for impregnating a matrix resin composition into chopped fiber bundles that are obtained by the producing device for chopped fiber bundles; and is not limited to the producing device of the embodiment illustrated in the drawing.

Further, the producing method for fiber-reinforced resin forming materials according to the first mode of the invention may have only to be a method including obtaining chopped fiber bundles by the producing method for chopped fiber bundles according to the first mode of the invention and impregnating a matrix resin composition into the chopped fiber bundles; and is not limited to a method that uses the producing device of the embodiment illustrated in the drawing.

For example, the producing device for chopped fiber bundles according to the first mode of the invention may be employed as chopped fiber bundle-producing means of a producing device for SMC other than the embodiment illustrated in the drawing.

Furthermore, the producing device for chopped fiber bundles according to the first mode of the invention may be employed as chopped fiber bundle-producing means of a producing device for a stampable sheet. Meanwhile, when a stampable sheet is to be produced, a material containing a thermoplastic resin is used as a matrix resin composition.

Examples of the thermoplastic resin include polyamide (nylon 6, nylon 66, and the like), polyolefin (polyethylene, polypropylene, and the like), modified polyolefin, polyester (polyethylene terephthalate, polybutylene terephthalate, and the like), polyethylene methacrylate, polycarbonate, polyamide-imide, polyphenylene oxide, polysulfone, polyethersulfone, polyetheretherketone, polyetherimide, polystyrene, an acrylonitrile-butylene-styrene copolymer, polyphenylene sulfide, liquid crystalline polyester, an acrylonitrile-styrene copolymer, and the like. Further, two or more kinds of these resins may be blended and used.

Second Mode of the Invention

<Cutting Blade for Carbon Fiber Bundles>

Figure 8:
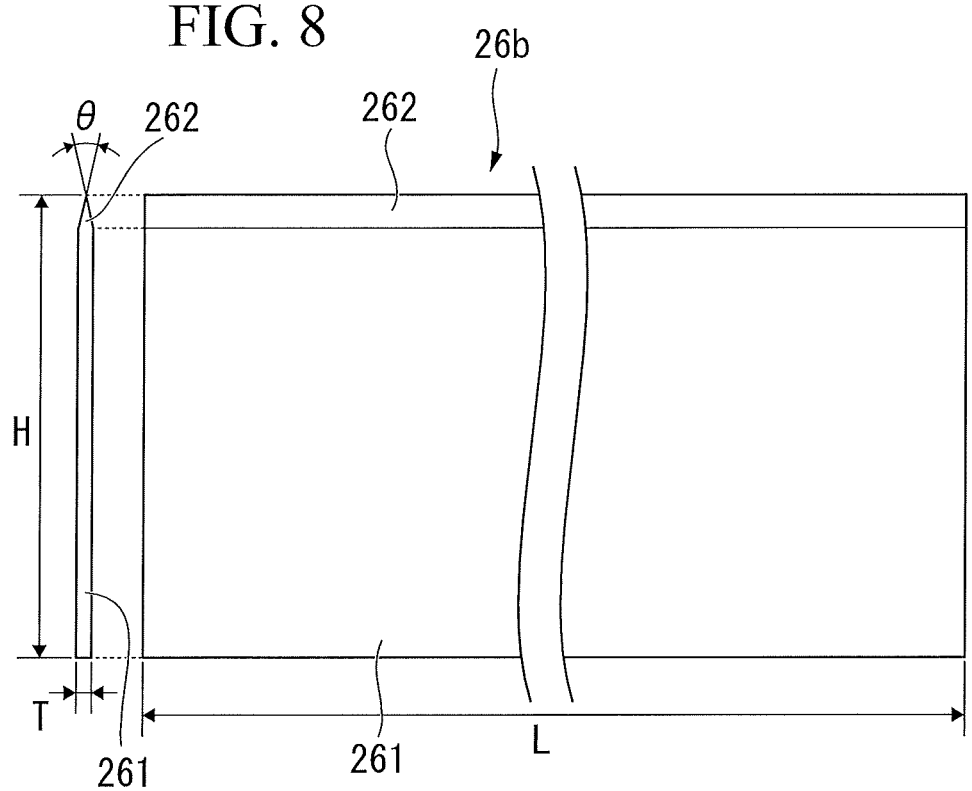
FIG. 8 is a side view and a front view illustrating an embodiment of a cutting blade for carbon fiber bundles according to a second mode of the invention.

FIG. 8 is a side view and a front view illustrating an embodiment of a cutting blade for carbon fiber bundles according to a second mode of the invention.

The cutting blade 26b for carbon fiber bundles is a flat plate-shaped flat blade. The cutting blade 26b for carbon fiber bundles includes a flat plate-shaped base portion 261 and a blade edge portion 262 that is formed at a first side of the cutting blade 26b for carbon fiber bundles formed along a longitudinal direction and extends along the first side.

The thickness T of the cutting blade 26b for carbon fiber bundles is 0.7 mm or less, is preferably in the range of 0.1 mm to 0.7 mm, and is more preferably in the range of 0.25 to 0.5 mm. When the thickness T of the cutting blade 26b for carbon fiber bundles is 0.7 mm or less, it is easy to perform work for inserting the cutting blade 26b for carbon fiber bundles into each groove of a roller to be described later while forming a locally-bent shape for the cutting of the carbon fiber bundles and twisting the cutting blade 26b for carbon fiber bundles. When the thickness T of the cutting blade 26b for carbon fiber bundles is 0.1 mm or more, it is possible to prevent a damage to a blade edge caused by a cutting force at the time of cutting of carbon fiber bundles while ensuring the dimension of a portion with a blade (the length of a sharp tip portion) and it is more difficult for the cutting blade 26b for carbon fiber bundles to be broken even though work for inserting the cutting blade 26b for carbon fiber bundles into each groove of the roller to be described later, while applying twist to the cutting blade 26b for carbon fiber bundles, is performed.

The length L of the cutting blade 26b for carbon fiber bundles is 300 mm or more, is preferably in the range of 400 to 2000 mm, and is more preferably in the range of 500 to 1800 mm. When the length L of the cutting blade 26b for carbon fiber bundles is 300 mm or more, it is possible to reduce the inclination (twist) of the longitudinal direction of the cutting blade 26b for carbon fiber bundles with respect to the direction of the rotation axis of the roller of a rotary cutter for carbon fiber bundles to be described later. Further, since many carbon fiber bundles can be cut at one time, the productivity of chopped carbon fiber bundles is improved. When the length L of the cutting blade 26b for carbon fiber bundles is 2000 mm or less, it is easy to handle the cutting blade 26b for carbon fiber bundles and it is difficult for the cutting blade 26b for carbon fiber bundles to be broken.

A ratio (L/H) of the length L of the cutting blade 26b for carbon fiber bundles to the height H of the cutting blade 26b for carbon fiber bundles is preferably larger than 11, is more preferably in the range of 30 to 360, and is still more preferably in the range of 50 to 250. When L/H is larger than 11, it is easy to perform work for inserting the cutting blade 26b for carbon fiber bundles into each groove of a roller to be described later while twisting the cutting blade 26b for carbon fiber bundles. When L/H is 360 or less, it is easy to handle the cutting blade 26b for carbon fiber bundles and it is difficult for the cutting blade 26b for carbon fiber bundles to be broken.

The material of each of the base portion 261 and the blade edge portion 262 is a steel material.

Examples of the steel material include the same material as the steel material exemplified as the material of the cutting blade 16b of the first mode.

Examples of the cutting blade for carbon fiber bundles according to the second mode of the invention include the following cutting blade (I) and the following cutting blade (II).

Cutting Blade (I):

A cutting blade for carbon fiber bundles where the blade angle of the tip of a blade edge portion is in the range of 25 to 50° and a coating layer made of at least one selected from a group consisting of titanium nitride, titanium carbide, and titanium carbonitride is provided on the surface of the blade edge portion.

Cutting Blade (II):

A cutting blade for carbon fiber bundles where the blade angle of the tip of a blade edge portion is in the range of 35 to 50 and a coating layer made of at least one selected from a group consisting of titanium nitride, titanium carbide, and titanium carbonitride is not provided on the surface of the blade edge portion.

(Cutting Blade (I))

The blade angle θ of the tip of the blade edge portion 262 of the cutting blade (I) is in the range of 25 to 50° and is more preferably in the range of 25 to 35°. When the blade angle θ is 25° or more and a specific coating layer is provided on the surface of the blade edge portion 262, it is difficult for the blade edge to be worn. When the blade angle θ is 50° or less, cutting resistance is reduced. Accordingly, the carbon fiber bundles are easily cut.

When the blade angle θ of the tip of the blade edge portion 262 is small, the blade edge is likely to be worn. Accordingly, a specific coating layer (not illustrated) is provided on the surface of the blade edge portion 262 in the cutting blade (I).

The coating layer is made of at least one selected from a group consisting of titanium nitride, titanium carbide, and titanium carbonitride.

The thickness of the coating layer is preferably larger than 1 µm and is more preferably in the range of 2 to 10 µm. When the thickness of the coating layer is larger than 1 µm, it is more difficult for the blade edge to be worn. When the thickness of the coating layer is 10 µm or less, the coating layer is not peeled and cutting resistance is reduced. Accordingly, the carbon fiber bundles are easily cut.

The coating layer may have only to be present on the surface of the blade edge portion 262 near the tip, and may not be present on the surface of the base portion 261 and may not be present on the entire surface of the blade edge portion 262.

The width of the coating layer is preferably in the range of 0.2 to 5.0 mm from the tip of the blade edge portion 262, is more preferably in the range of 0.5 to 2.0 mm, and is still more preferably the width of a portion protruding form the peripheral surface of the roller of the rotary cutter to be described later.

The coating layer can be formed by a publicly known method, such as a physical vapor deposition method (an ion plating method, a vacuum deposition method, an electron beam method, a sputtering method, or the like) or a chemical vapor deposition method.

(Cutting Blade (II))

The blade angle θ of the tip of the blade edge portion 262 of the cutting blade (II) is in the range of 35 to 50° and is more preferably in the range of 37 to 43°. When the blade angle θ is 35° or more, it is difficult for the blade edge to be worn. When the blade angle θ is 50° or less, cutting resistance is reduced. Accordingly, the carbon fiber bundles are easily cut.

When the blade angle θ of the tip of the blade edge portion 262 is large, it is difficult for the blade edge to be worn. Accordingly, a specific coating layer made of at least one selected from a group consisting of titanium nitride, titanium carbide, and titanium carbonitride does not need to be provided on the surface of the blade edge portion 262 in the second mode.

(Action Mechanism)

In the cutting blade 26b for carbon fiber bundles having been described above, the base portion 261 and the blade edge portion 262 are made of a steel material. Accordingly, even though the cutting blade is thin (thickness: 0.7 mm or less) and long (length: 300 mm or more), it is difficult for the cutting blade to be broken when twist is applied to the cutting blade. On the other hand, if the cutting blade made of cemented carbide, which is commonly used as the material of the cutting blade, is thin (thickness: 0.7 mm or less) and long (length: 300 mm or more), the cutting blade is likely to be broken when twist is applied to the cutting blade.

Further, since the base portion 261 and the blade edge portion 262 are made of a steel material in the cutting blade 26b for carbon fiber bundles having been described above, the cutting blade 26b for carbon fiber bundles is more inexpensive than a cutting blade made of cemented carbide.

Furthermore, in the cutting blade 26b for carbon fiber bundles having been described above, the blade angle θ of the tip of the blade edge portion 262 is in the range of 25 to 50° and a coating layer made of at least one selected from a group consisting of titanium nitride, titanium carbide, and titanium carbonitride is provided on the surface of the blade edge portion 262 or the blade angle θ of the tip of the blade edge portion 262 is in the range of 35 to 50° even in a case in which the coating layer is not provided. Accordingly, it is difficult for the blade edge to be worn.

Other Embodiments

The cutting blade for carbon fiber bundles according to the second mode of the invention is a flat blade-like cutting blade for carbon fiber bundles having a thickness of 0.7 mm or less and a length of 300 mm or more; and includes a flat plate-shaped base portion that is made of a steel material and a blade edge portion that is formed at a first side of the cutting blade for carbon fiber bundles formed along a longitudinal direction and is made of a steel material. The blade angle of the tip of the blade edge portion may be in the range of 25 to 50° and a coating layer made of at least one selected from a group consisting of titanium nitride, titanium carbide, and titanium carbonitride may be provided on the surface of the blade edge portion, or the blade angle of the tip of the blade edge portion may be in the range of 35 to 50° and the coating layer may not be provided. The cutting blade for carbon fiber bundles according to the second mode of the invention is not limited to the cutting blade for carbon fiber bundles of the embodiment illustrated in the drawing.

Figure 9:
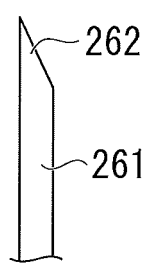
FIG. 9 is an enlarged view of a blade edge portion illustrating another embodiment of the cutting blade for carbon fiber bundles according to the second mode of the invention.
Figure 10:
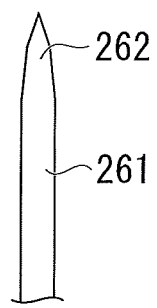
FIG. 10 is an enlarged view of a blade edge portion illustrating still another embodiment of the cutting blade for carbon fiber bundles according to the second mode of the invention.

For example, the blade edge portion 262 is not limited to a double-edged blade illustrated in FIG. 8, may be a single-edged blade illustrated in FIG. 9, and may be a multi-stage blade, such as a two-stage blade illustrated in FIG. 10, of which the blade angle is increased in stages toward the tip.

<Rotary Cutter for Carbon Fiber Bundles>

Figure 11:
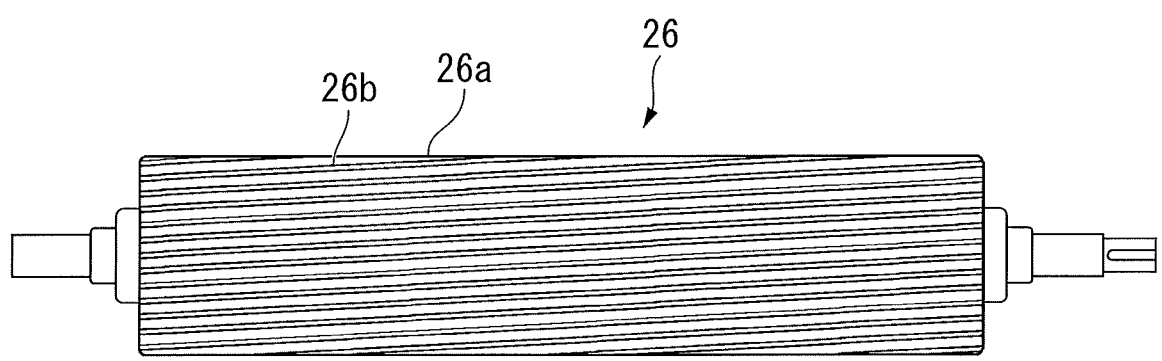
FIG. 11 is a front view illustrating an embodiment of a rotary cutter for carbon fiber bundles according to the second mode of the invention.

FIG. 11 is a front view illustrating an embodiment of a rotary cutter for carbon fiber bundles according to the second mode of the invention.

The rotary cutter 26 for carbon fiber bundles is a rotary cutter where a plurality of cutting blades 26b for carbon fiber bundles are mounted on the peripheral surface of a roller 26a at predetermined intervals in the circumferential direction of the roller 26a so that the longitudinal direction of each cutting blade has an inclination (twist) with respect to the direction of the rotation axis of the roller 26a.

The roller 26a is made of metal (stainless steel or the like). Grooves into which the cutting blades 26b for carbon fiber bundles are fitted are formed in a spiral shape on the peripheral surface of the roller 26a so that the longitudinal direction of each groove slightly has an inclination (twist) with respect to the direction of the rotation axis of the roller.

The base portion 261 of the cutting blade 26b for carbon fiber bundles is inserted into each groove of the roller 26a together with a spacer and a leaf spring, and is fixed so that at least the blade edge portion 262 protrudes from the peripheral surface of the roller 26a.

An interval between the cutting blades 26b and 26b for carbon fiber bundles in the circumferential direction of the roller 26a is the same as the length of the chopped carbon fiber bundle. The interval between the cutting blades 26b and 26b for carbon fiber bundles, that is, the length of the chopped carbon fiber bundle is usually in the range of 5 to 100 mm and is preferably in the range of 10 to 55 mm.

The inclination (twist) of the longitudinal direction of the cutting blade 26b for carbon fiber bundles with respect to the direction of the rotation axis of the roller 26a is determined depending on the length (surface length) of the roller 26a, the length of the carbon fiber bundles to be cut, and the number of carbon fiber bundles to be cut at one time (which is often one). Since a plurality of fiber bundles F' arranged in parallel are simultaneously cut by one cutting blade 26b for carbon fiber bundles in a case in which the longitudinal direction of the cutting blade 26b for carbon fiber bundles is set to the same direction as the direction of the rotation axis of the roller, a large force is applied to the rotary cutter 26 for carbon fiber bundles and an anvil roller to be described later at every cutting. Accordingly, since the application of the large force continuously occurs, a chopper unit to be described later is significantly vibrated and loud noise is generated. On the other hand, since each cutting blade 26b for carbon fiber bundles is mounted so that the longitudinal direction of each cutting blade has an inclination (twist) with respect to the direction of the rotation axis of the roller 26a, the respective carbon fiber bundles F' of the plurality of carbon fiber bundles F' arranged in parallel are cut in sequence toward the second end portion from the first end portion of one cutting blade 26b for carbon fiber bundles. For this reason, since a large force is not applied to the rotary cutter 26 for carbon fiber bundles and the anvil roller to be described later at every cutting, the vibration of the chopper unit to be described later is suppressed.

It is preferable that the inclination (twist) of the longitudinal direction of the cutting blade 26b for carbon fiber bundles with respect to the direction of the rotation axis of the roller 26a is set so that the position of a second end portion of a cutting blade 26b for carbon fiber bundles in the circumferential direction is the same as the position of a first end portion of a cutting blade 26b for carbon fiber bundles adjacent to the position of the second end portion in the circumferential direction. Since each cutting blade 26b for carbon fiber bundles is mounted so that the position of a second end portion of a cutting blade 26b for carbon fiber bundles in the circumferential direction is the same as the position of a first end portion of a cutting blade 26b for carbon fiber bundles adjacent to the position of the second end portion and the longitudinal direction of each cutting blade has an inclination (twist) with respect to the direction of the rotation axis of the roller 26a, the respective fiber bundles F' of a plurality of fiber bundles F' arranged in parallel are cut in sequence toward the second end portion from the first end portion of one cutting blade 26b for carbon fiber bundles and cutting using a cutting blade 26b for carbon fiber bundles adjacent to one cutting blade 26b for carbon fiber bundles is started after the cutting using one cutting blade 26b for carbon fiber bundles is completed. For this reason, since a large force is not applied to the rotary cutter 26 for carbon fiber bundles and the anvil roller to be described later at every cutting, the vibration of the chopper unit to be described later is suppressed.

(Action Mechanism)

In the rotary cutter 26 for carbon fiber bundles having been described above, the base portion 261 and the blade edge portion 262 of the cutting blade 26b for carbon fiber bundles are made of a steel material. Accordingly, when the cutting blade 26b for carbon fiber bundles is mounted, it is difficult for the cutting blade 26b for carbon fiber bundles to be broken even though twist is applied to the cutting blade 26b for carbon fiber bundles.

Further, since the base portion 261 and the blade edge portion 262 of the cutting blade 26b for carbon fiber bundles are made of a steel material in the rotary cutter 26 for carbon fiber bundles having been described above, the rotary cutter 26 for carbon fiber bundles is more inexpensive than a rotary cutter including cutting blades made of cemented carbide.

Furthermore, the rotary cutter 26 for carbon fiber bundles having been described above includes the cutting blade 26b for carbon fiber bundles where the blade angle θ of the tip of the blade edge portion 262 is in the range of 25 to 50° and a coating layer made of at least one selected from a group consisting of titanium nitride, titanium carbide, and titanium carbonitride is provided on the surface of the blade edge portion 262 or the blade angle θ of the tip of the blade edge portion 262 is in the range of 35 to 50° even in a case in which the coating layer is not provided. Accordingly, it is difficult for the blade edge of the cutting blade 26b for carbon fiber bundles to be worn.

Other Embodiments

The rotary cutter for carbon fiber bundles of the invention may have only to include a roller and a plurality of cutting blades that are mounted on the peripheral surface of the roller at predetermined intervals in the circumferential direction of the roller so that the longitudinal direction of each cutting blade has an inclination with respect to the direction of the rotation axis of the roller; and each of the cutting blades may have only to be the cutting blade for carbon fiber bundles of the invention. The rotary cutter for carbon fiber bundles of the invention is not limited to the rotary cutter for carbon fiber bundles of the embodiment illustrated in the drawing.

<Producing Device for Chopped Carbon Fiber Bundles>

Figure 12:
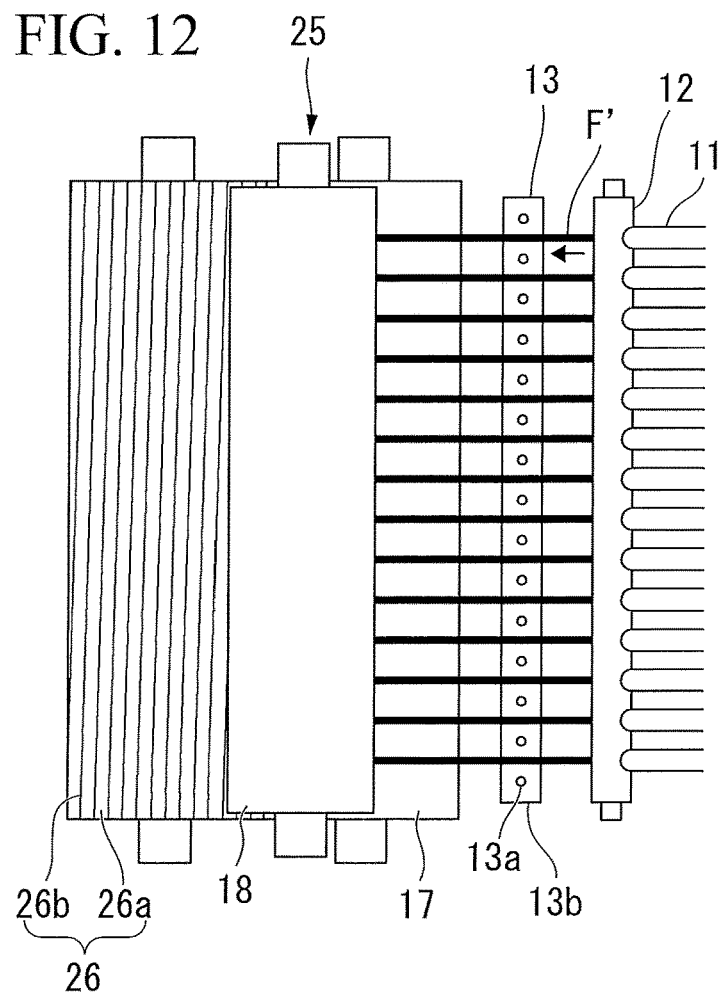
FIG. 12 is a top view illustrating an embodiment of a producing device for chopped carbon fiber bundles according to the second mode of the invention.
Figure 13:
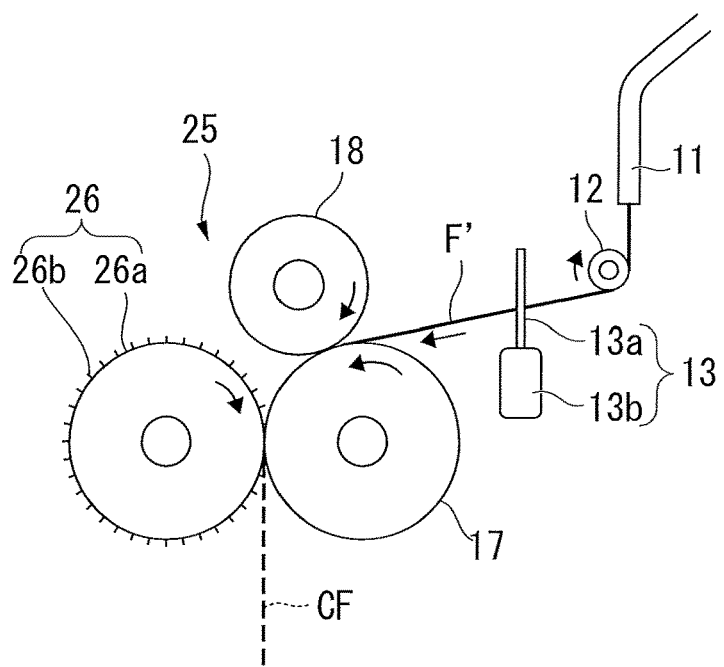
FIG. 13 is a side view of the producing device for chopped carbon fiber bundles of FIG. 12.

FIG. 12 is a top view illustrating an embodiment of a producing device for chopped carbon fiber bundles according to the second mode of the invention, and FIG. 13 is a side view of the producing device for chopped carbon fiber bundles of FIG. 12.

The producing device for chopped carbon fiber bundles includes: a plurality of supply hoses 11 that discharge long carbon fiber bundles F', which are supplied from the outside, downward; a guide roller 12 that guides the carbon fiber bundles F', which are discharged from the supply hoses 11, in a substantially horizontal direction; a comb guide 13 (guide means) that is provided on the downstream side of the guide roller 12 and restricts the travel direction of the carbon fiber bundles F'; and a chopper unit 25 (cutting means) that is provided on the downstream side of the comb guide 13 and cuts the carbon fiber bundles F' while drawing the carbon fiber bundles F'.

Hereinafter, the same components as the components of the producing device for chopped fiber bundles of FIGS. 1 and 2 are denoted by the same reference numerals as the reference numerals of FIGS. 1 and 2 and the detailed description thereof will be omitted.

The chopper unit 25 is the same as the chopper unit 15 of FIGS. 1 and 2 except that the rotary cutter 16 of FIGS. 1 and 2 is changed to the rotary cutter 26 for carbon fiber bundles.

(Producing Method for Chopped Carbon Fiber Bundles)

A producing method for chopped carbon fiber bundles, which uses the producing device for chopped carbon fiber bundles illustrated in FIGS. 12 and 13, is the same as the producing method for chopped fiber bundles using the producing device for chopped fiber bundles illustrated in FIGS. 1 and 2 except that fiber bundles F are changed to carbon fiber bundles F', the scratch bar 14 is omitted, the rotary cutter 16 is changed to the rotary cutter 26 for carbon fiber bundles, and chopped carbon fiber bundles CF' are obtained instead of chopped fiber bundles CF. Accordingly, the detailed description of the producing method for chopped carbon fiber bundles will be omitted.

(Carbon Fiber Bundle)

Examples of the carbon fiber bundle F' include a flat-unidirectional carbon fiber bundle of which a plurality of carbon fibers are drawn in one direction and are aligned with each other, and the like.

The carbon fiber bundle F' may be a carbon fiber bundle that has been treated with a sizing agent or the like.

The carbon fiber bundle F' is preferably a carbon fiber bundle that can be relatively inexpensively obtained among products standardly produced by a maker for producing carbon fibers and is formed of 1000 to 60000 carbon fibers, and is more preferably a carbon fiber bundle that is formed of 10000 to 600000 carbon fibers (which is called a regular tow and a large tow).

The diameter of the carbon fiber is preferably in the range of 4 to 10 µm and is more preferably in the range of 5 to 8 µm.

The carbon fiber may be a carbon fiber that has been subjected to surface treatment.

As the carbon fiber, one of the carbon fibers may be used alone and two or more of the carbon fibers may be used together.

(Action Mechanism)

Since the producing device for chopped carbon fiber bundles according to the second mode of the invention having been described above includes the rotary cutter for carbon fiber bundles according to the second mode of the invention in which it is difficult for the blade edges of the cutting blades to be worn, chopped carbon fiber bundles can be continuously produced over a long time with high productivity.

Further, since the producing device for chopped carbon fiber bundles according to the second mode of the invention having been described above includes the rotary cutter for carbon fiber bundles according to the second mode of the invention on which a plurality of cutting blades are mounted so that the longitudinal direction of each cutting blade has an inclination with respect to the direction of the rotation axis of the roller, vibration at the time of cutting of carbon fiber bundles is suppressed.

Other Embodiments

The producing device for chopped carbon fiber bundles according to the second mode of the invention may have only to include the rotary cutter for carbon fiber bundles according to the second mode of the invention, and is not limited to the producing device of the embodiment illustrated in the drawings.

For example, the guide means is not limited to the comb guide 13 of the embodiment illustrated in the drawings; and may be a comb-like guide other than the comb guide 13, a groove-like guide where grooves are formed on the surface of a square bar, a plate, a roller, or the like, and the like.

Further, the producing device may include widening means for widening the carbon fiber bundles F' that is provided between the comb guide 13 (guide means) and the chopper unit 25 (cutting means). Examples of the widening means include a scratch bar, air blowing means (air nozzle), and the like. In a case in which the long carbon fiber bundles F', which are widened by the widening means, are cut by the chopper unit 25 including the cutting blades 26b for carbon fiber bundles, the width of a portion of the cutting blade 26b for carbon fiber bundles, which comes into contact with the carbon fiber bundles F', is increased in comparison with a case in which the carbon fiber bundles F', which are not widened, are cut. Accordingly, the local wear of the cutting blade 26b for carbon fiber bundles is relatively suppressed.

Furthermore, the producing device may include oscillating means for oscillating the comb guide 13 (guide means) in a direction where the travel of the carbon fiber bundles F' is restricted, that is, a direction crossing (orthogonal to) the vertical direction and a direction crossing (orthogonal to) the travel direction of the carbon fiber bundles F'. When the comb guide 13 is oscillated in a direction where the travel of the carbon fiber bundles F' is restricted, that is, a direction crossing (orthogonal to) the vertical direction and a direction crossing (orthogonal to) the travel direction of the carbon fiber bundles F', the travel positions of the carbon fiber bundles F' are oscillated in substantially the same direction as the longitudinal direction of the cutting blade 26b for carbon fiber bundles of the chopper unit 25. As a result, since the positions of portions of the cutting blades 26b for carbon fiber bundles, which come into contact with the carbon fiber bundles F', are also oscillated, the cutting blades 26b for carbon fiber bundles are uniformly worn and the local wear of the cutting blades 26b for carbon fiber bundles is suppressed.

<Production of Fiber-Reinforced Resin Forming Materials>

(Producing Device for Fiber-Reinforced Resin Forming Materials)

Figure 14:
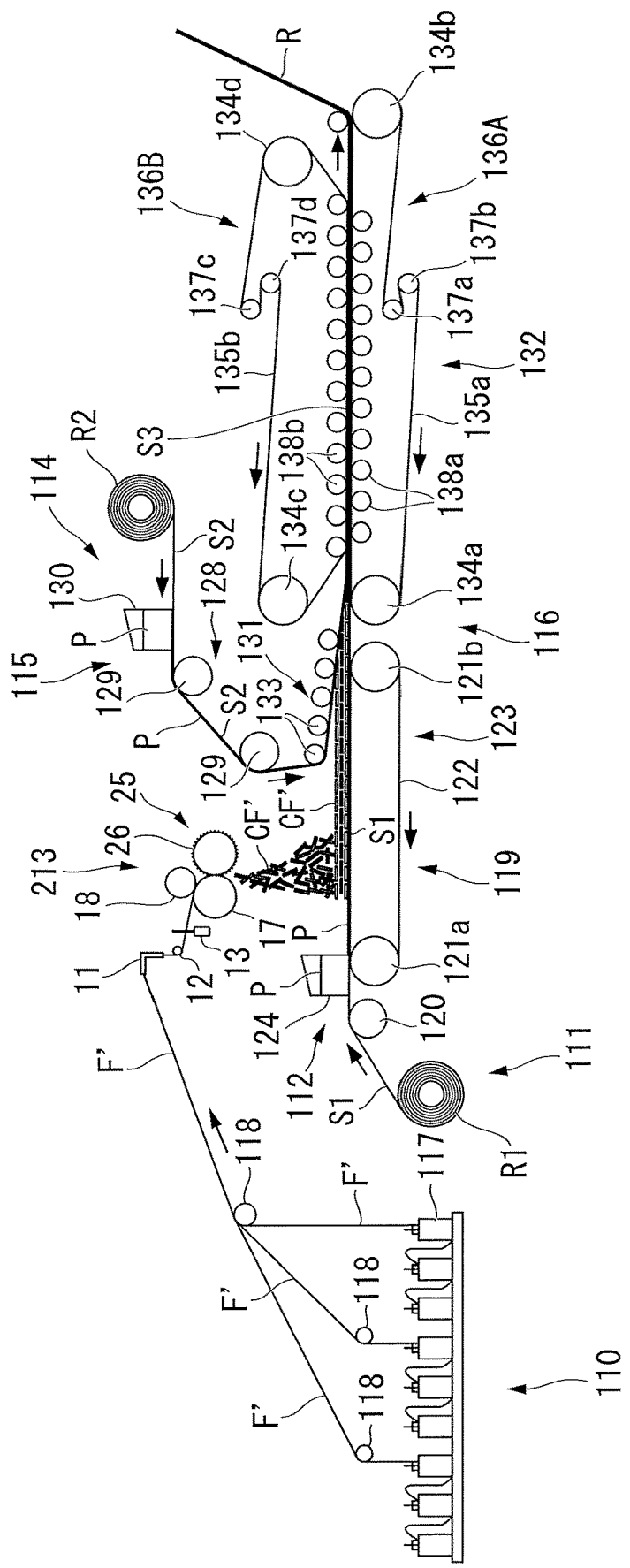
FIG. 14 is a side view illustrating an embodiment of a producing device for fiber-reinforced resin forming materials according to the second mode of the invention.

FIG. 14 is a side view illustrating an embodiment of a producing device for fiber-reinforced resin forming materials according to the second mode of the invention.

The producing device for fiber-reinforced resin forming materials includes fiber bundle supply means 110, first sheet supply means 111, first coating means 112, chopped carbon fiber bundle-producing means 213, second sheet supply means 114, second coating means 115, and impregnation means 116.

Hereinafter, the same components as the components of the producing device for fiber-reinforced resin forming materials of FIG. 7 are denoted by the same reference numerals as the reference numerals of FIG. 7 and the detailed description thereof will be omitted.

The chopped carbon fiber bundle-producing means 213 is the producing device for chopped carbon fiber bundles according to the second mode of the invention.

The chopped carbon fiber bundle-producing means 213 is the same as the chopped fiber bundle-producing means 113 of FIG. 7 except that the scratch bar 14 is omitted and the rotary cutter 16 is changed to the rotary cutter 26 for carbon fiber bundles.

(Producing Method for Fiber-Reinforced Resin Forming Materials)

A producing method for fiber-reinforced resin forming materials, which uses the producing device for fiber-reinforced resin forming materials illustrated in FIG. 14, is the same as the producing method for fiber-reinforced resin forming materials using the producing device for fiber-reinforced resin forming materials illustrated in FIG. 7 except that fiber bundles F are changed to carbon fiber bundles F', the chopped fiber bundle-producing means 113 is changed to the chopped carbon fiber bundle-producing means 213, and chopped carbon fiber bundles CF' are obtained instead of chopped fiber bundles CF. Accordingly, the detailed description of the producing method for fiber-reinforced resin forming materials will be omitted.

(Action Mechanism)

Since the producing device for fiber-reinforced resin forming materials according to the second mode of the invention having been described above includes the producing device for chopped carbon fiber bundles according to the second mode of the invention that can continuously produce chopped carbon fiber bundles over a long time with high productivity, fiber-reinforced resin forming materials can be continuously produced over a long time with high productivity.

Other Embodiments

The producing device for fiber-reinforced resin forming materials according to the second mode of the invention may have only to include the producing device for chopped carbon fiber bundles according to the second mode of the invention and the impregnation means for impregnating a matrix resin composition into chopped carbon fiber bundles that are obtained by the producing device for chopped carbon fiber bundles; and is not limited to the producing device of the embodiment illustrated in the drawing.

For example, the producing device for chopped carbon fiber bundles of the invention may be employed as chopped carbon fiber bundle-producing means of a producing device for SMC other than the embodiment illustrated in the drawing.

Further, the producing device for chopped carbon fiber bundles of the invention may be employed as chopped carbon fiber bundle-producing means of a producing device for a stampable sheet. Meanwhile, when a stampable sheet is to be produced, a material containing a thermoplastic resin is used as a matrix resin composition.

Third Mode of the Invention

<Cutter>

A cutter according to a third mode of the invention is a cutter that is used to continuously cut long fiber bundles. The cutter of the invention includes a cutter roller and a rubber roller. In the cutter according to the third mode of the invention, the cutter roller and the rubber roller are rotated in directions opposite to each other while each blade of the cutter roller is pressed against the outer peripheral surface of the rubber roller, and continuously cut the fiber bundles while the fiber bundles are interposed between the cutter roller and the rubber roller.

Figure 15:
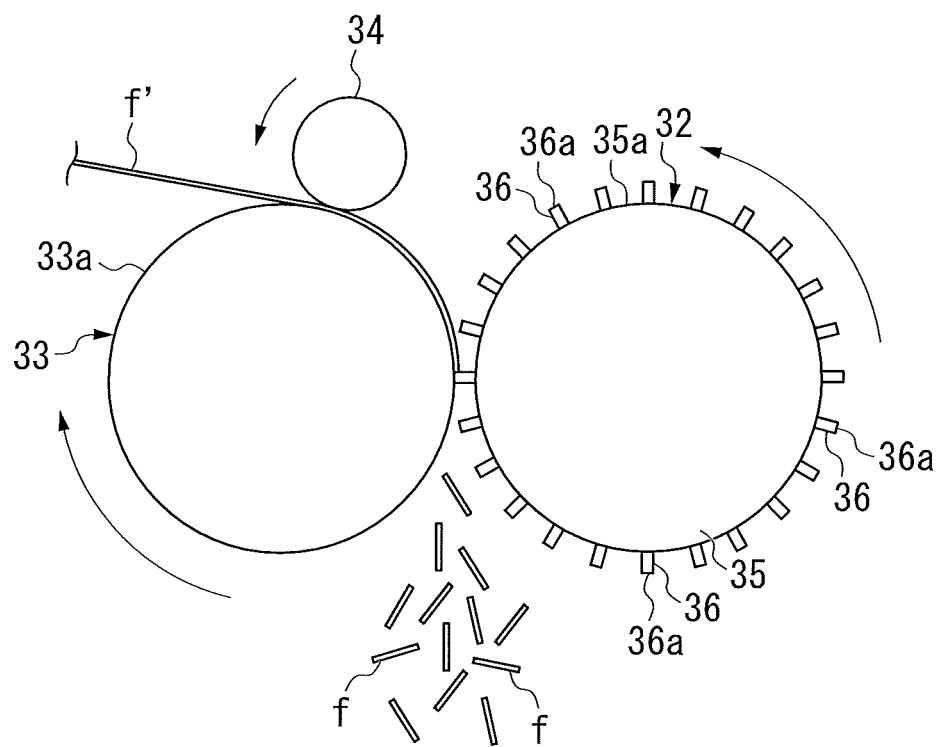
FIG. 15 is a schematic structural diagram illustrating an embodiment of a cutter according to a third mode of the invention.

An embodiment of the cutter according to the third mode of the invention will be described in detail below. As illustrated in FIG. 15, a cutter 31 of this embodiment includes a cutter roller 32 which a plurality of flat plate-shaped blades 36 are provided on the outer peripheral surface thereof, a rubber roller 33, and a pinch roller 34. All of the cutter roller 32, the rubber roller 33, and the pinch roller 34 have a cylindrical roller.

The cutter roller 32 and the rubber roller 33 are arranged side by side in a horizontal direction and are adjacent to each other in a state in which the blade 36 of the cutter roller 32 is pressed against the outer peripheral surface 33a of the rubber roller 33. The cutter roller 32 and the rubber roller 33 are adapted to be rotated in directions opposite to each other. In this embodiment, the cutter roller 32 is disposed on the right side of the rubber roller 33, the rubber roller 33 is rotated in a clockwise direction, and the cutter roller 32 is rotated in a counterclockwise direction.

Further, the pinch roller 34 is provided so that long fiber bundles f' are interposed between the rubber roller 33 and the pinch roller 34 above the position of a portion of the rubber roller 33 against which the blade 36 of the cutter roller 32 is pressed. The rubber roller 33 and the pinch roller 34 are adapted to be rotated in directions opposite to each other in a state in which the fiber bundles f' are interposed between the rubber roller 33 and the pinch roller 34, and are adapted to draw the fiber bundles f'. In this embodiment, the rubber roller 33 is rotated in the clockwise direction and the cutter roller 32 and the pinch roller 34 are rotated in the counterclockwise direction. Accordingly, the rubber roller 33, the cutter roller 32, and the pinch roller 34 are adapted to send the long fiber bundles f', which are drawn from the left side, to the lower side while moving the long fiber bundles f' along the outer peripheral surface 33a of the rubber roller 33.

When the rubber roller 33 and the pinch roller 34 are rotated in directions opposite to each other in a state in which the long fiber bundles f' are interposed between the rubber roller 33 and the pinch roller 34, the fiber bundles f' are drawn into the cutter 31. Then, the long fiber bundles f' are continuously cut on the downstream side of the pinch roller 34 by the plurality of blades 36 of the cutter roller 32, which are rotated in the direction opposite to the direction of the rubber roller 33, so that a plurality of fiber bundles f (chopped fiber bundles) are formed.

(Cutter Roller)

The cutter roller 32 includes a cylindrical roller body 35 and a plurality of flat plate-shaped blades 36 that are provided so as to protrude from the outer peripheral surface 35a of the roller body 35 in a radial direction. The respective blades 36 of the cutter roller 32 are provided on the outer peripheral surface 35a at intervals in the circumferential direction so as to extend in the axial direction of the roller body 35.

The diameter of the roller body is not particularly limited, and can be set to be equal to the diameter of a cutter roller of a publicly known cutter. The length of the roller body is not particularly limited, and may be appropriately set.

The shape of the cross-section of the blade 36 perpendicular to the longitudinal direction of the blade 36 is a rectangular shape. A tip surface 36a, which is flat and is perpendicular to the height direction of the blade 36, is formed at the tip of each blade 36. Since the tip surface perpendicular to the height direction of the blade is formed at the tip of each blade in the invention, damage to the outer peripheral surface of the rubber roller is suppressed even though the blade of the cutter roller is pressed against the outer peripheral surface of the rubber roller.

The thickness T (FIG. 16) of the blade 36 is preferably in the range of 0.10 to 0.36 mm and is more preferably in the range of 0.10 to 0.12 mm. When the thickness of the blade is 0.36 mm or less, it is easy to cut fiber bundles. When the thickness of the blade is 0.12 mm or less, it is easy to cut fiber bundles regardless of the tensile strength of the fiber bundles as an object to be cut. Further, the blade edge is worn in a case in which fiber bundles formed of carbon fibers, which have hardness higher than metal, or the like are continuously cut. When the thickness of the blade is equal to or lower than an upper limit, cutting performance does not deteriorate even though the blade is worn. Accordingly, the frequency of replacement of the cutter roller can be reduced. When the thickness of the blade is equal to or higher than a lower limit, it is difficult for the blade to be damaged at the time of cutting.

The height of the blade, that is, a distance between the outer peripheral surface and the tip of the blade is preferably in the range of 0.5 to 3.0 mm and is more preferably in the range of 1.0 to 2.0 mm. When the height of the blade is equal to or higher than a lower limit, it is difficult for miscut to occur even though thickness unevenness is increased. When the height of the blade is equal to or lower than an upper limit, it is easy to suppress the occurrence of the defect (chipping) of the blade edge.

The length of the blade is not particularly limited. For example, the blades can be formed from one end to the other end of the cutter roller in the axial direction of the cutter roller. The blades are not limited to a mode in which the blades are provided on the outer peripheral surface of the roller body so as to extend in the axial direction. For example, the blades may be provided in a spiral shape so as to be inclined with respect to the axial direction in the front view of the outer peripheral surface of the roller body.

The number of the blades, which are to be arranged in the circumferential direction of the outer peripheral surface of the cutter roller, may be appropriately set according to the diameter of the roller body, the length of a chopped fiber bundle that intends to be obtained by cutting, or the like.

The interval between the blades in the circumferential direction of the outer peripheral surface may be appropriately set according to the length of a chopped fiber bundle that intends to be obtained by cutting.

The material of the cutter roller may have only to be a material that allows fiber bundles to be cut, and a publicly known material can be employed as the material of the cutter roller. Specific examples of the material of the cutter roller include iron, stainless steel, super steel, and the like.

(Rubber Roller)

A publicly known rubber roller, which is used for a cutter for cutting fiber bundles, can be used as the rubber roller 33. Examples of the material of the rubber roller include urethane rubber, nitrile rubber, and the like. The diameter of the rubber roller is not particularly limited, and can be set to be equal to the diameter of, for example, a rubber roller of a publicly known cutter. The length of the rubber roller is not particularly limited and may be appropriately set.

(Pinch Roller)

A publicly known pinch roller, which is used for a cutter for cutting fiber bundles, can be used as the pinch roller 34, and examples of the pinch roller 34 include a pinch roller made of stainless steel. The diameter of the pinch roller is not particularly limited, and can be set to be equal to the diameter of, for example, a pinch roller of a publicly known cutter. The length of the pinch roller is not particularly limited and may be appropriately set.

Tip portions of blades are sharpened to cut fiber bundles in a cutter roller that is used for a cutter in the related art. For this reason, since the outer peripheral surface of the rubber roller is damaged by the tip portions of the blades, there is a concern that rubber scraps may be likely to be generated and may be mixed into fiber-reinforced resin materials. In contrast, the tip surface, which is flat and is perpendicular to the height direction of the blade, is formed at each blade of the cutter roller in the cutter of the invention. Accordingly, when the blade is pressed against the outer peripheral surface of the rubber roller at the time of cutting of fiber bundles, the flat tip surface of the blade is pressed against the outer peripheral surface of the rubber roller. For this reason, since it is difficult for the outer peripheral surface of the rubber roller to be damaged and it is difficult for rubber scraps to be generated, the mixing of rubber scraps is suppressed when fiber-reinforced resin materials are to be produced.

<Producing Device for Fiber-Reinforced Resin Materials>

A producing device for fiber-reinforced resin materials according to the third mode of the invention includes the cutter according to the third mode of the invention, and an impregnation unit that impregnates a matrix resin composition into a sheet-like fiber bundle group formed of fiber bundles cut by the cutter. The producing device for fiber-reinforced resin materials according to the third mode of the invention can employ a publicly known mode except that the producing device includes the cutter according to the third mode of the invention.

Figure 17:
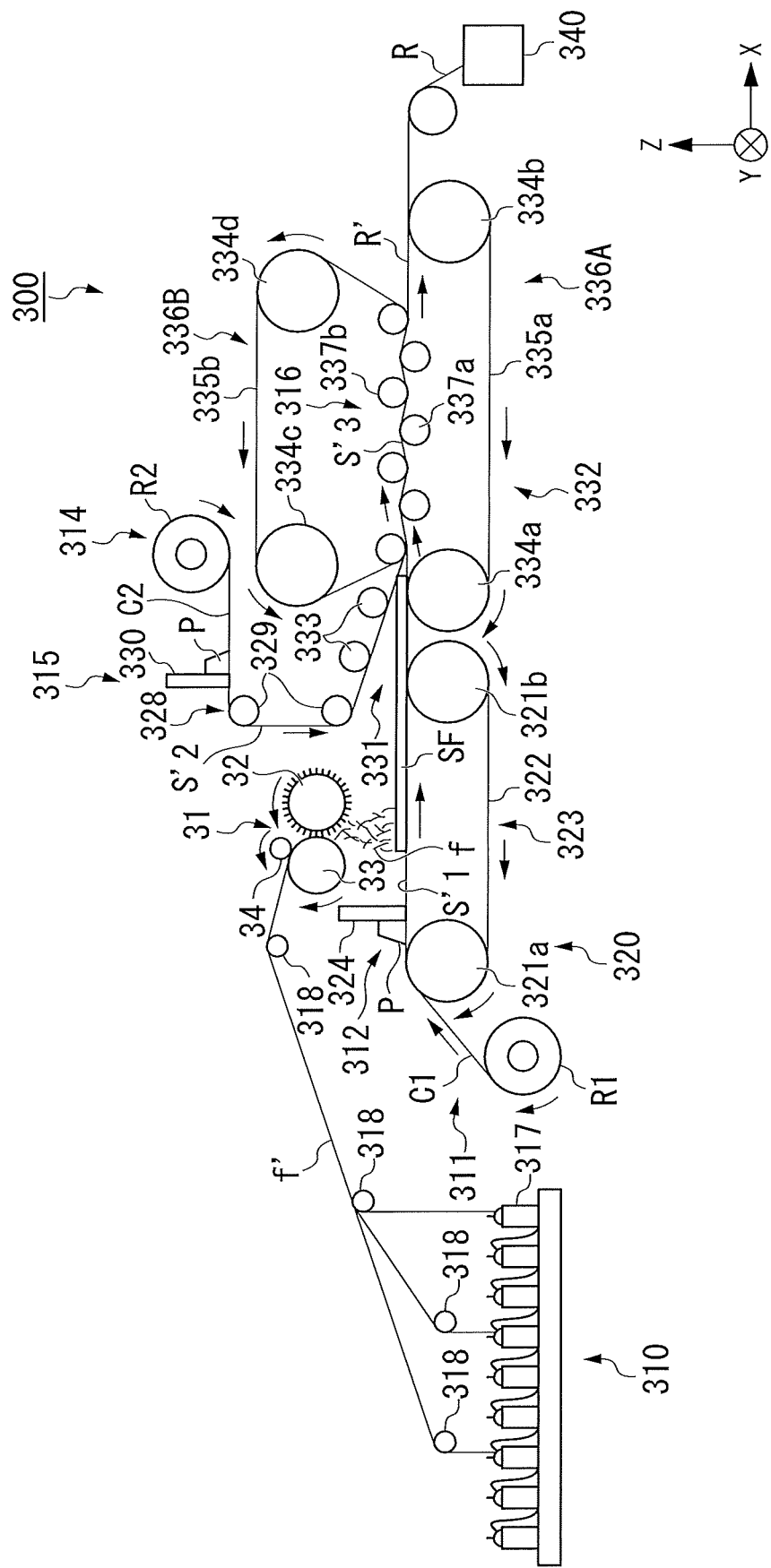
FIG. 17 is a schematic structural diagram illustrating an embodiment of a producing device using a producing method for fiber-reinforced resin materials according to the third mode of the invention.

A producing device 300 illustrated in FIG. 17 will be described as an embodiment of the producing device for fiber-reinforced resin materials according to the third mode of the invention. In the following description, an XYZ orthogonal coordinate system will be set and a positional relationship between the respective members will be described with reference to the XYZ orthogonal coordinate system as necessary.

The producing device 300 includes a fiber bundles supply unit 310, a first carrier sheet supply unit 311, a first conveying unit 320, a first coating unit 312, a cutter 31, a second carrier sheet supply unit 314, a second conveying unit 328, a second coating unit 315, an impregnation unit 316, and a storage container 340.

The first carrier sheet supply unit 311 supplies a long first carrier sheet C1, which is drawn out of a first original fabric roll R1, to the first conveying unit 320. The first conveying unit 320 includes a conveyor 323 in which an endless belt 322 is suspended between a pair of pulleys 321a and 321b. The conveyor 323 turns the endless belt 322 by rotating the pair of pulleys 321a and 321b in the same direction to convey the first carrier sheet C1 to the right side in an X-axis direction on the surface of the endless belt 322.

The first coating unit 312 is positioned directly above a portion of the first conveying unit 320 close to the pulley 321a, and includes a coater 324 that supplies paste P made of a matrix resin composition. While the first carrier sheet C1 passes through the coater 324, the surface of the first carrier sheet C1 is coated with the paste P with a predetermined thickness so that a first resin sheet S'1 is formed. The first resin sheet S'1 travels with the conveyance of the first carrier sheet C1.

The fiber bundles supply unit 310 supplies long fiber bundles f to the cutter 31 through a plurality of guide rollers 318 while drawing long fiber bundles f out of a plurality of bobbins 317. The cutter 31 is positioned above the first carrier sheet C1 on the rear stage of the first coating unit 312 in the conveying direction. In the cutter 31, the supplied fiber bundles f are interposed between the rubber roller 33 and the cutter roller 32 and are continuously cut to a predetermined length. Cut fiber bundles fall and are dispersed on the first resin sheet S'1, so that a sheet-like fiber bundle group SF is formed.

The second carrier sheet supply unit 314 supplies a long second carrier sheet C2, which is drawn out of a second original fabric roll R2, to the second conveying unit 328. The second conveying unit 328 is positioned above the first carrier sheet C1 that is conveyed by the conveyor 323, and includes a plurality of guide rollers 329. The second conveying unit 328 conveys the second carrier sheet C2, which is supplied from the second carrier sheet supply unit 314, in a direction opposite to the direction of the first carrier sheet C1 (to the left side in the X-axis direction), and then reverses the conveying direction of the second carrier sheet C2 to the same direction as the direction of the first carrier sheet C1 by the plurality of guide rollers 329.

The second coating unit 315 is positioned directly above the second carrier sheet C2 that is conveyed in the direction opposite to the direction of the first carrier sheet C1, and includes a coater 330 that supplies paste P made of a matrix resin composition. While the second carrier sheet C2 passes through the coater 330, the surface of the second carrier sheet C2 is coated with the paste P with a predetermined thickness so that a second resin sheet S'2 is formed. The second resin sheet S'2 travels with the conveyance of the second carrier sheet C2.

The impregnation unit 316 is positioned on the rear stage of the cutter 31 provided above the first conveying unit 320, and includes a bonding mechanism 331 and a pressure applying mechanism 332. The bonding mechanism 331 is positioned above the pulley 321b of the conveyor 323, and includes a plurality of bonding rollers 333. The plurality of bonding rollers 333 are arranged side by side in the conveying direction in a state in which the plurality of bonding rollers 333 are in contact with the back of the second carrier sheet C2 on which the second resin sheet S'2 is formed. Further, the plurality of bonding rollers 333 are arranged so that the second carrier sheet C2 gradually approaches the first carrier sheet C1.

In the bonding mechanism 331, the first and second carrier sheets C1 and C2 are conveyed while being superimposed in a state in which the first resin sheet S'1, the sheet-like fiber bundle group SF, and the second resin sheet S'2 are interposed between the first and second carrier sheets C1 and C2. Here, an element, in which the first and second carrier sheets C1 and C2 are bonded to each other in a state in which the first resin sheet S'1, the sheet-like fiber bundle group SF, and the second resin sheet S'2 are interposed between the first and second carrier sheets C1 and C2, is referred to as a precursor laminate S'3.

The pressure applying mechanism 332 is positioned on the rear stage of the bonding mechanism 331, and includes a lower conveyor 336A in which an endless belt 335a is suspended between a pair of pulleys 334a and 334b and an upper conveyor 336B in which an endless belt 335b is suspended between a pair of pulleys 334c and 334d. The lower and upper conveyors 336A and 336B are disposed so as to face each other in a state in which the endless belts 335a and 335b are pressed against each other.

When the pair of pulleys 334a and 334b of the lower conveyor 336A is rotated in the same direction in the pressure applying mechanism 332, the endless belt 335a is turned. Further, when the pair of pulleys 334c and 334d of the upper conveyor 336B is rotated in the same direction in the pressure applying mechanism 332, the endless belt 335b is turned at the same speed as the endless belt 335a in a direction opposite to the direction of the endless belt 335a. Accordingly, the precursor laminate S'3, which is interposed between the endless belts 335a and 335b, is conveyed to the right side in the X-axis direction.

The pressure applying mechanism 332 is further provided with a plurality of lower rollers 337a and a plurality of upper rollers 337b. The plurality of lower rollers 337a are arranged side by side in the conveying direction in a state in which the plurality of lower rollers 337a are in contact with the back of the pressed portion of the endless belt 335a. Likewise, the plurality of upper rollers 337b are arranged side by side in the conveying direction in a state in which the plurality of upper rollers 337b are in contact with the back of the pressed portion of the endless belt 335b. Further, the plurality of lower rollers 337a and the plurality of upper rollers 337b are arranged side by side alternately in the conveying direction of the precursor laminate S'3.

The pressure applying mechanism 332 applies pressure to the precursor laminate S'3 by the plurality of lower rollers 337a and the plurality of upper rollers 337b while the precursor laminate S'3 passes between the endless belts 335a and 335b.

At this time, a fiber-reinforced resin material R' (SMC) is formed in a state in which the matrix resin composition of the first resin sheet S'1 and the matrix resin composition of the second resin sheet S'2 are impregnated into the sheet-like fiber bundle group SF and is interposed between the first and second carrier sheets C1 and C2.

The storage container 340 is a container that is used to store an original fabric R in which the fiber-reinforced resin material R' is interposed between the first and second carrier sheets C1 and C2. The original fabric R is stored in the storage container 340 by, for example, transfer or the like.

In the producing device for fiber-reinforced resin materials according to the third mode of the invention having been described above, the tip surface, which is flat and is perpendicular to the height direction of the blade, is formed at each of the blades of the cutter roller of the cutter. Accordingly, even though the blade is pressed against the outer peripheral surface of the rubber roller, it is difficult for the outer peripheral surface of the rubber roller to be damaged and it is difficult for rubber scraps to be generated. For this reason, the mixing of rubber scraps into fiber-reinforced resin materials to be produced is suppressed.

Meanwhile, the producing device for fiber-reinforced resin materials according to the third mode of the invention is not limited to the above-mentioned producing device 300. For example, the producing device for fiber-reinforced resin materials according to the third mode of the invention may be adapted to wind the produced original fabric on a bobbin.

<Producing Method for Fiber-Reinforced Resin Materials>

A producing method for fiber-reinforced resin materials according to the third mode of the invention is a method of producing fiber-reinforced resin materials by using the cutter according to the third mode of the invention having been described above. The producing method for fiber-reinforced resin materials according to the third mode of the invention includes the following dispersion step and the following impregnation step.

Dispersion step: a step of forming a sheet-like fiber bundle group by continuously cutting long fiber bundles with the cutter according to the third mode of the invention and dispersing a plurality of cut fiber bundles (chopped fiber bundles) on a first resin sheet, which is made of a matrix resin composition, in the shape of a sheet.

Impregnation step: a step of obtaining a fiber-reinforced resin material by laminating a second resin sheet, which is made of a matrix resin composition, to the sheet-like fiber bundle group to form a material precursor, applying pressure to the material precursor from both surfaces, and impregnating the matrix resin composition into the sheet-like fiber bundle group.

A producing method for a fiber-reinforced resin material laminate using the producing device 300 will be described as an embodiment of the producing method for fiber-reinforced resin materials according to the third mode of the invention. The following dispersion step and the following impregnation step are sequentially performed in the producing method for a fiber-reinforced resin material laminate using the producing device 300.

(Dispersion Step)

A long first carrier sheet C1 is drawn out of the first original fabric roll R1 and is supplied to the first conveying unit 320 by the first carrier sheet supply unit 311 and is coated with paste P with a predetermined thickness by the first coating unit 312, so that a first resin sheet S'1 is formed. The first carrier sheet C1 is conveyed by the first conveying unit 320, so that the first resin sheet S'1 formed on the first carrier sheet C1 is made to travel.

Fiber bundles f', which are supplied from the fiber bundles supply unit 310, are continuously cut by the cutter 31 so as to have a predetermnined length, and cut fiber bundles f fall and are disposed on the first resin sheet S'1.

Accordingly, a sheet-like fiber bundle group SF where the respective fiber bundles f are dispersed with a random fiber orientation is continuously formed on the first resin sheet S'1 that travels.

Since the tip surface 36a, which is flat and is perpendicular to the height direction of the blade 36, is formed at each blade 36 of the cutter roller 32 of the cutter 31 in this embodiment, it is difficult for the outer peripheral surface 33a of the rubber roller 33 to be damaged and it is difficult for rubber scraps to be generated even though the blade 36 is pressed against the outer peripheral surface of the rubber roller. For this reason, the mixing of rubber scraps into the sheet-like fiber bundle group SF is suppressed.

A reinforcing fiber forming the fiber bundle is not particularly limited, and, for example, an inorganic fiber, an organic fiber, a metal fiber, or a reinforcing fiber having a hybrid structure in which these are combined can be used as the reinforcing fiber forming the fiber bundle.

Examples of the inorganic fiber include a carbon fiber, a graphitic fiber, a silicon carbide fiber, an alumina fiber, a tungsten carbide fiber, a boron fiber, a glass fiber, and the like. Examples of the organic fiber include an aramid fiber, a high-density polyethylene fiber, other general nylon fibers, a polyester fiber, and the like. Examples of the metal fiber include a fiber made of stainless steel, a fiber made of iron, and the like, and may include a carbon fiber coated with metal. Considering a mechanical property, such as the strength of a fiber-reinforced resin material-molded body, it is preferable that the carbon fiber is used among these.

As the reinforcing fiber, one of the fibers may be used alone and two or more of the fibers may be used together.

The average width of the fiber bundles is preferably in the range of 1 to 50 mm and is more preferably in the range of 1.5 to 15 mm, and is still more preferably in the range of 2 to 8 mm. Since a fiber-reinforced resin material is more likely to flow during molding when the average width of the fiber bundles is equal to or higher than a lower limit, molding is easy. When the average width of the fiber bundles is equal to or lower than an upper limit, a fiber-reinforced resin material-molded body, which is excellent in properties, such as tensile strength and the tensile modulus of elasticity, is likely to be obtained.

Meanwhile, the average width of the fiber bundles is measured by the following method. A fiber-reinforced resin material is heated in an electric furnace or the like to decompose a matrix resin composition, and ten fiber bundles are randomly selected from remaining fiber bundles. The width of each of the ten fiber bundles is measured at three portions, that is, both end portions and the middle portion of each fiber bundle in the axial direction of the fiber by a vernier caliper, and an average value of all of these measured values is used as the average width.

An average fiber length of the cut fiber bundles is preferably in the range of 5 to 100 mm, is more preferably in the range of 10 to 60 mm, and is still more preferably in the range of about 25 to 50 mm. When the average fiber length of the fiber bundles is equal to or higher than a lower limit, a fiber-reinforced resin material-molded body, which is excellent in properties, such as tensile strength and the tensile modulus of elasticity, is likely to be obtained. Since a fiber-reinforced resin material is more likely to flow during molding when the average fiber length of the fiber bundles is equal to or lower than an upper limit, molding is easy.

Meanwhile, the average fiber length of the fiber bundles is measured by the following method. The maximum fiber length of each of ten fiber bundles, which are obtained in the same manner as the measurement of the average width, is measured by a vernier caliper, and an average value of all of these measured values is used as the average fiber length.

The average thickness of the fiber bundles is preferably in the range of 0.01 to 0.5 mm, is more preferably in the range of 0.02 to 0.09 mm, and is still more preferably in the range of 0.025 to 0.07 n. When the average thickness of the fiber bundles is equal to or higher than a lower limit, it is easy to impregnate a matrix resin composition into the fiber bundle group. When the average thickness of the fiber bundles is equal to or lower than an upper limit, a fiber-reinforced resin material-molded body, which is excellent in properties, such as tensile strength and the tensile modulus of elasticity, is likely to be obtained.

Meanwhile, the average thickness of the fiber bundles is measured by the following method. The thickness of each of ten fiber bundles, which are obtained in the same manner as the measurement of the average width, is measured at three portions, that is, both end portions and the middle portion of each fiber bundle in the axial direction of the fiber by a vernier caliper, and an average value of all of these measured values is used as the average thickness.

It is preferable that a composition containing a thermosetting resin is used as the matrix resin composition.

The thermosetting resin is not particularly limited, and examples of the thermosetting resin include an epoxy resin, a phenolic resin, an unsaturated polyester resin, a urethane resin, a urea resin, a melamine resin, an imide resin, and the like. As the thermosetting resin, one of the resins may be used alone and two or more of the resins may be used together.

An additive, such as a hardener, an internal mold release agent, a thickener, or a stabilizer, may be blended with the matrix resin composition as necessary.

(Impregnation Step)

A long second carrier sheet C2 is drawn out of the second original fabric roll R2 and is supplied to the second conveying unit 328 by the second carrier sheet supply unit 314. The surface of the second carrier sheet C2 is coated with paste P with a predetermined thickness by the second coating unit 315, so that a second resin sheet S'2 is formed.

The second carrier sheet C2 is conveyed to make the second resin sheet S'2 travel, and the second resin sheet S'2 is bonded and laminated to a sheet-like fiber bundle group SF together with the second carrier sheet C2 by the bonding mechanism 331. Accordingly, a precursor laminate S'3 where a material precursor in which the sheet-like fiber bundle group SF is interposed between the first and second resin sheets S'1 and S'2 is interposed between the first and second carrier sheets C1 and C2 is continuously formed.

Pressure is applied to the precursor laminate S'3 from both surfaces and the matrix resin composition of the first resin sheet S'1 and the matrix resin composition of the second resin sheet S'2 are impregnated into the sheet-like fiber bundle group SF by the pressure applying mechanism 332, so that a fiber-reinforced resin material R' is formed between the first and second carrier sheets C1 and C2. An original fabric R in a state in which the fiber-reinforced resin materials R' is interposed between the first and second carrier sheets C1 and C2 is transferred to and stored in the storage container 340.

Since the tip surface, which is flat and is perpendicular to the height direction of the blade, is formed at each of the blades of the cutter roller of the cutter in the producing method for fiber-reinforced resin materials according to the third mode of the invention having been described above, it is difficult for the outer peripheral surface of the rubber roller to be damaged and it is difficult for rubber scraps to be generated even though the blade is pressed against the outer peripheral surface of the rubber roller. Accordingly, since the mixing of rubber scraps into the sheet-like fiber bundle group is suppressed, the mixing of rubber scraps into fiber-reinforced resin materials, which are finally obtained, is also suppressed.

Fourth Mode of the Invention

<Cutting Blade for Carbon Fiber Bundles>

A cutting blade for carbon fiber bundles according to a fourth mode of the invention is a cutting blade in which a ratio ($\theta/T$) of a blade angle $\theta$ (°) to the thickness T (mm) of the blade is in the range of 35 to 1800. It is preferable that the cutting blade for carbon fiber bundles according to the fourth mode of the invention is a cutting blade used in a case in which the reinforcing fiber is a carbon fiber in the first to third modes of the invention.

When $\theta/T$ is set in this range, a cutting blade, which is excellent in durability, wear resistance, and mountability on a roller and is suitable to cut carbon fibers, can be obtained.

$\theta/T$ is preferably in the range of 50 to 250 and is more preferably in the range of 60 to 100.

Further, $\theta/T$ is preferably in the range of 1000 to 1800 and is more preferably in the range of 1500 to 1800.

It is preferable that the following cutting blade ($\alpha$), the following cutting blade ($\beta$), and the following cutting blade ($\gamma$) are used as the cutting blade for carbon fiber bundles according to the fourth mode of the invention.

Cutting Blade ($\alpha$):

A cutting blade for carbon fiber bundles that is a flat blade-like cutting blade for carbon fiber bundles in which the $\theta/T$ is in the range of 35 to 500 and includes a flat plate-shaped base portion made of a steel material and a blade edge portion formed at a first side of the cutting blade for carbon fiber bundles formed along a longitudinal direction and made of a steel material, and a coating layer made of at least one selected from a group consisting of titanium nitride, titanium carbide, and titanium carbonitride is provided on the surface of the blade edge portion.

Cutting Blade ($\beta$):

A cutting blade for carbon fiber bundles that is a flat blade-like cutting blade for carbon fiber bundles in which $\theta/T$ is in the range of 50 to 500 and includes a flat plate-shaped base portion made of a steel material and a blade edge portion formed at a first side of the cutting blade for carbon fiber bundles formed along a longitudinal direction and made of a steel material, and a coating layer is not provided on the surface of the blade edge portion.

Cutting Blade ($\gamma$):

A cutting blade for carbon fiber bundles that is a flat plate-shaped blade in which $\theta/T$ is in the range of 500 to 1800 and a tip surface, which is flat and is perpendicular to the height direction of the blade, is formed at the tip of the blade.

(Cutting Blade ($\alpha$) and Cutting Blade ($\beta$))

The shape of the cutting blade ($\alpha$) and the shape of the cutting blade ($\beta$) are the same as the shape of the cutting blade 26b for carbon fiber bundles according to the second mode.

The thickness T, the length L, and a ratio (L/H) of the length L to the height H of each of the cutting blade ($\alpha$) and the cutting blade ($\beta$) are the same as those of the cutting blade 26b for carbon fiber bundles according to the second mode, and the preferred ranges thereof are also the same as those of the cutting blade 26b for carbon fiber bundles according to the second mode.

The material of each of the base portion and the blade edge portion of each of the cutting blade ($\alpha$) and the cutting blade ($\beta$) is a steel material. It is more difficult for the cutting blade ($\alpha$) and the cutting blade ($\beta$), which are made of a steel material, to be broken than the cutting blade made of cemented carbide when twist is applied. Further, the cutting blade made of a steel material is more inexpensive than the cutting blade made of cemented carbide.

Examples of the steel material include the same material as the steel material exemplified as the material of the cutting blade 16b of the first mode.

(Cutting Blade ($\alpha$))

$\theta/T$ of the cutting blade ($\alpha$) is in the range of 35 to 500. When $\theta/T$ is 35 or more, it is difficult for the blade edge to be worn and it is easy to perform work for inserting the cutting blade ($\alpha$) into each groove of the roller while forming a locally-bent shape for the cutting of carbon fiber bundles and twisting the cutting blade ($\alpha$). When $\theta/T$ is 500 or less, it is possible to prevent damage to the blade edge caused by a cutting force at the time of cutting of carbon fiber bundles and it is difficult for the cutting blade ($\alpha$) to be broken even though work for inserting the cutting blade ($\alpha$) into each groove of the roller while applying twist to the cutting blade ($\alpha$) is performed.

The blade angle $\theta$ of the tip of the blade edge portion of the cutting blade ($\alpha$) is the same as that of the cutting blade (I) of the second mode, and the preferred range thereof is also the same as that of the cutting blade (I) of the second mode.

When the blade angle $\theta$ of the tip of the blade edge portion is small, the blade edge is likely to be worn. Accordingly, a specific coating layer is provided on the surface of the blade edge portion of the cutting blade ($\alpha$).

The coating layer of the cutting blade ($\alpha$) is the same as the cutting blade (I) of the second mode, and the preferred range thereof is also the same as that of the cutting blade (I) of the second mode.

(Cutting Blade ($\beta$))

$\theta/T$ of the cutting blade ($\beta$) is in the range of 50 to 500. When $\theta/T$ is 50 or more, it is difficult for the blade edge to be worn and it is easy to perform work for inserting the cutting blade ($\beta$) into each groove of the roller while forming a locally-bent shape for the cutting of carbon fiber bundles and twisting the cutting blade ($\beta$). When $\theta/T$ is 500 or less, it is possible to prevent damage to the blade edge caused by a cutting force at the time of cutting of carbon fiber bundles and it is difficult for the cutting blade ($\beta$) to be broken even though work for inserting the cutting blade ($\beta$) into each groove of the roller while applying twist to the cutting blade ($\beta$) is performed.

The blade angle $\theta$ of the tip of the blade edge portion of the cutting blade ($\beta$) is the same as that of the cutting blade (II) of the second mode, and the preferred range thereof is also the same as that of the cutting blade (II) of the second mode.

When the blade angle $\theta$ of the tip of the blade edge portion is large, it is difficult for the blade edge to be worn. Accordingly, a specific coating layer made of at least one selected from a group consisting of titanium nitride, titanium carbide, and titanium carbonitride does not need to be provided on the surface of the blade edge portion of the cutting blade ($\beta$).

(Cutting Blade ($\gamma$))

In the cutting blade ($\gamma$), a tip surface ($\theta$: 180°), which is flat and is perpendicular to the height direction of the blade, is formed at the tip of the flat plate-shaped blade and $\theta/T$ of the flat plate-shaped blade is in the range of 500 to 1800. When $\theta/T$ is 500 or more, it is easy to cut fiber bundles. When $\theta/T$ is 1800 or less, it is possible to prevent damage to the blade edge caused by a cutting force at the time of cutting of carbon fiber bundles and it is difficult for the cutting blade ($\gamma$) to be broken even though work for inserting the cutting blade (γ) into each groove of the roller while applying twist to the cutting blade (γ) is performed.

The shape of the cutting blade (γ) is the same as the shape of the blade 36 of the third mode, and the action mechanism of the cutting blade (γ) is also the same as that of the blade 36 of the third mode.

The thickness T, the height, and the length of the cutting blade (γ) are the same as those of the blade 36 of the third mode, and the preferred ranges thereof are also the same as those of the blade 36 of the third mode.

<Producing Device for Chopped Fiber Bundles>

A producing device for chopped fiber bundles according to a fourth mode of the invention includes the cutting blades for carbon fiber bundles according to the fourth mode of the invention.

Examples of the producing device for chopped fiber bundles according to the fourth mode of the invention include: a producing device that includes the cutting blades for carbon fiber bundles according to the fourth mode of the invention instead of the cutting blades 16b of the rotary cutter 16 in the producing device for chopped fiber bundles according to the first mode of the invention; a producing device that includes the cutting blades for carbon fiber bundles according to the fourth mode of the invention instead of the cutting blades 26b for carbon fiber bundles of the rotary cutter 26 for carbon fiber bundles in the producing device for chopped carbon fiber bundles according to the second mode of the invention; and a producing device that includes the cutting blades for carbon fiber bundles according to the fourth mode of the invention instead of the blades 36 of the cutter roller 32 in the cutter according to the third mode of the invention.

<Producing Method for Chopped Fiber Bundles>

A producing method for chopped fiber bundles according to the fourth mode of the invention is a method of cutting fiber bundles by using the cutting blade for carbon fiber bundles according to the fourth mode of the invention.

Examples of the producing method for chopped fiber bundles according to the fourth mode of the invention include: a method using the producing device for chopped fiber bundles according to the fourth mode of the invention as the producing device for chopped fiber bundles in the producing method for fiber-reinforced resin forming materials according to the first mode of the invention; a method using the producing device for chopped fiber bundles according to the fourth mode of the invention as the producing device for chopped carbon fiber bundles in the producing method for fiber-reinforced resin forming materials according to the second mode of the invention; and a method using the producing device for chopped fiber bundles according to the fourth mode of the invention as the cutter in the producing method for fiber-reinforced resin materials according to the third mode of the invention.

EXAMPLES

The invention will be described in detail with reference to Examples, but the invention is not limited thereto.

Experimental Example 1

A relationship between the blade angle of the tip of the blade edge portion and cutting resistance:

A cutting blade (thickness T: 0.3 mm, length L: 100 mm, height H: 8 mm, the blade angle θ of the tip of a blade edge portion: 20°) made of an alloy tool steel material (SKS81) was produced.

A urethane rubber sheet (thickness: 20 mm, length: 40 mm, and width: 40 mm) was prepared as a blade-receiving rubber.

Carbon fiber tow (manufactured by Mitsubishi Rayon Co., Ltd., PYROFIL (registered trademark) TR50S15L, the number of carbon fibers: 15000, the diameter of carbon fiber: 7 μm) was prepared as a carbon fiber bundle.

The cutting blade was mounted on a blade holder for exclusive use that is mounted on an end mill chuck of a cutting test device (a device using Cosmo Center manufactured by Okuma Corporation and a dynamometer 9221A manufactured by Kistler Group). Carbon fiber bundles and the blade-receiving rubber were disposed below the cutting blade so that the direction of a fiber was orthogonal to the longitudinal direction of the cutting blade, and cutting resistance, which was generated when the carbon fiber bundles were cut by the cutting blade while being pushed against the blade-receiving rubber by the cutting blade, was measured by a dynamometer installed directly below the blade-receiving rubber. The carbon fiber bundles were cut a total of ten times without the replacement of the cutting blade, and an average value of the cutting resistance was obtained.

Figure 18:
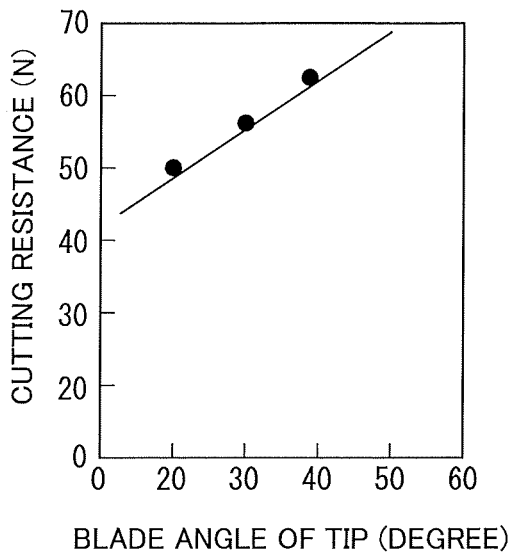
FIG. 18 is a graph illustrating a relationship between the blade angle of the tip of the blade edge portion and cutting resistance.

A cutting blade of which the blade angle of the tip of a blade edge portion is changed to 30° and a cutting blade of which the blade angle of the tip of a blade edge portion is changed to 40° were produced, and average values of the cutting resistance were also obtained from these cutting blades in the same manner as described above. A relationship between the blade angle of the tip of the blade edge portion and cutting resistance is illustrated in FIG. 18.

It was found that it was easy to cut carbon fiber bundles since initial cutting resistance can be reduced to about 70 N or less when the blade angle of the tip of the blade edge portion is 50° or less.

Experimental Example 2

A relationship between the amount of wear of the tip of the blade edge portion and cutting resistance:

A cutting blade (thickness T: 0.3 mm, length L: 100 mm, height H: 8 mm, the blade angle θ of the tip of a blade edge portion: 20°) made of an alloy tool steel material (SKS81) was produced.

The same blade-receiving rubber, carbon fiber bundles, and cutting test device as those of Experimental example 1 were prepared.

The cutting blade was mounted on a blade holder for exclusive use of the cutting test device. Carbon fiber bundles and the blade-receiving rubber were disposed below the cutting blade so that the direction of a fiber was orthogonal to the longitudinal direction of the cutting blade, and cutting resistance, which was generated when the carbon fiber bundles were cut by the cutting blade while being pushed against the blade-receiving rubber by the cutting blade, was measured by a dynamometer installed directly below the blade-receiving rubber. The carbon fiber bundles were cut a total of ten times without the replacement of the cutting blade, and an average value of the cutting resistance was obtained.

Figure 19:
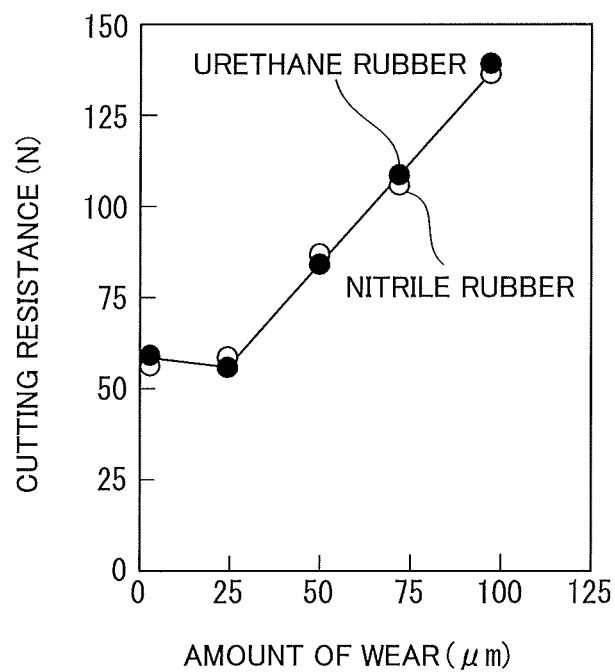
FIG. 19 is a graph illustrating a relationship between the amount of wear of the tip of the blade edge portion and cutting resistance.

Chamfering was performed at the tip of the blade edge portion to make the blade edge be artificially worn. The amount of wear was changed to 25 μm, 50 μm, 75 μm, and 100 μm. Average values of the cutting resistance were also obtained from these cutting blades in the same manner as described above. A relationship between the amount of wear of the tip of the blade edge portion and cutting resistance is illustrated in FIG. 19.

Further, an average value of cutting resistance was obtained in the same manner as described above except that the blade-receiving rubber is changed to a nitrile rubber sheet. A relationship between the amount of wear of the tip of the blade edge portion and cutting resistance is illustrated in FIG. 19.

Cutting resistance tended to increase with an increase in the amount of wear of the tip of the blade edge portion.

Experimental Example 3

Figure 20:
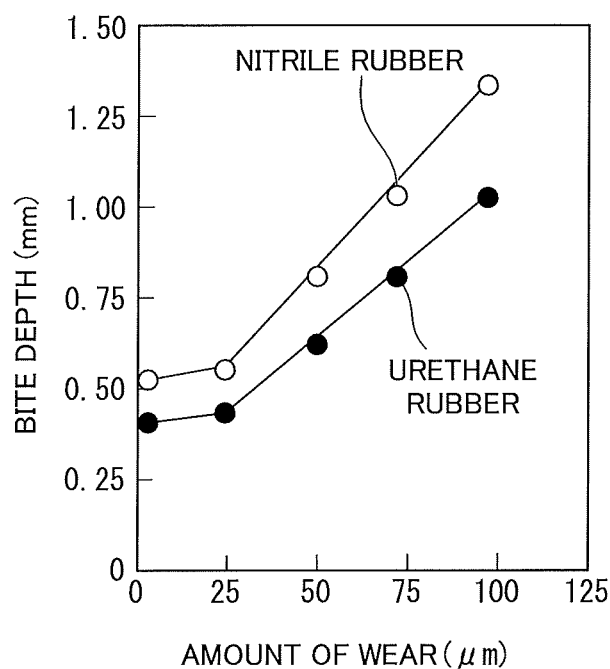
FIG. 20 is a graph illustrating a relationship between the amount of wear of the tip of the blade edge portion and the bite depth of the tip of the blade edge portion into a blade-receiving rubber.

A relationship between the amount of wear of the tip of the blade edge portion and the bite depth of the tip of the blade edge portion into a blade-receiving rubber:

Cutting resistance was measured in Experimental example 2, and the bite depth of the tip of a cutting blade into a blade-receiving rubber was measured. A relationship between the amount of wear of the tip of the blade edge portion and the bite depth of the tip of the cutting blade into the blade-receiving rubber is illustrated in FIG. 20.

The bite depth of the tip of the cutting blade into the blade-receiving rubber tended to increase with an increase in the amount of wear of the tip of the blade edge portion. The bite of the tip of the cutting blade is less in a case in which the blade-receiving rubber is urethane rubber. Accordingly, it was expected that the urethane rubber would be less damaged by the cutting blade.

Example 1

A cutting blade (thickness T: 0.3 mm, length L: 900 mm, height H: 8 mm, the blade angle θ of the tip of a blade edge portion: 20°, the coating layer of the blade edge portion: without) made of an alloy tool steel material (SKS81) was produced.

A roller for a rotary cutter (length (surface length): 1000 mm, outer diameter: 210 mm) made of stainless steel was prepared. Grooves into which cutting blades were to be fitted were formed in a spiral shape on the peripheral surface of the roller at intervals of 25.4 mm in the circumferential direction so that the longitudinal direction of each groove had an inclination (twist) of 1.46° with respect to the direction of the rotation axis of the roller.

The cutting blades are mounted on the peripheral surface of the roller, so that a rotary cutter was produced. In this case, the length of a portion, which protruded from the peripheral surface of the roller, of each cutting blade including the blade edge portion was set to 1 mm.

An anvil roller (length (surface length): 1000 mm, outer diameter: 190 mm), which a rubber member (urethane rubber) was provided on the peripheral surface thereof, was prepared.

A touch roller (length (surface length): 1000 mm, outer diameter: 87 mm) made of stainless steel was prepared.

A producing device for chopped carbon fiber bundles was assembled as illustrated in FIGS. 12 and 13.

Carbon fiber tow (manufactured by Mitsubishi Rayon Co., Ltd., PYROFIL (registered trademark) TR50S15L, the number of carbon fibers: 15000, the diameter of carbon fiber: 7 μm) was prepared as a carbon fiber bundle.

The cutting of carbon fiber bundles was performed by using the producing device for chopped carbon fiber bundles. The cutting was stopped at regular intervals and the amount of wear of the tip of the blade edge portion of each cutting blade was measured. A relationship between the number of times of cutting and the amount of wear of the tip of the blade edge portion is illustrated in FIG. 21.

Figure 21:
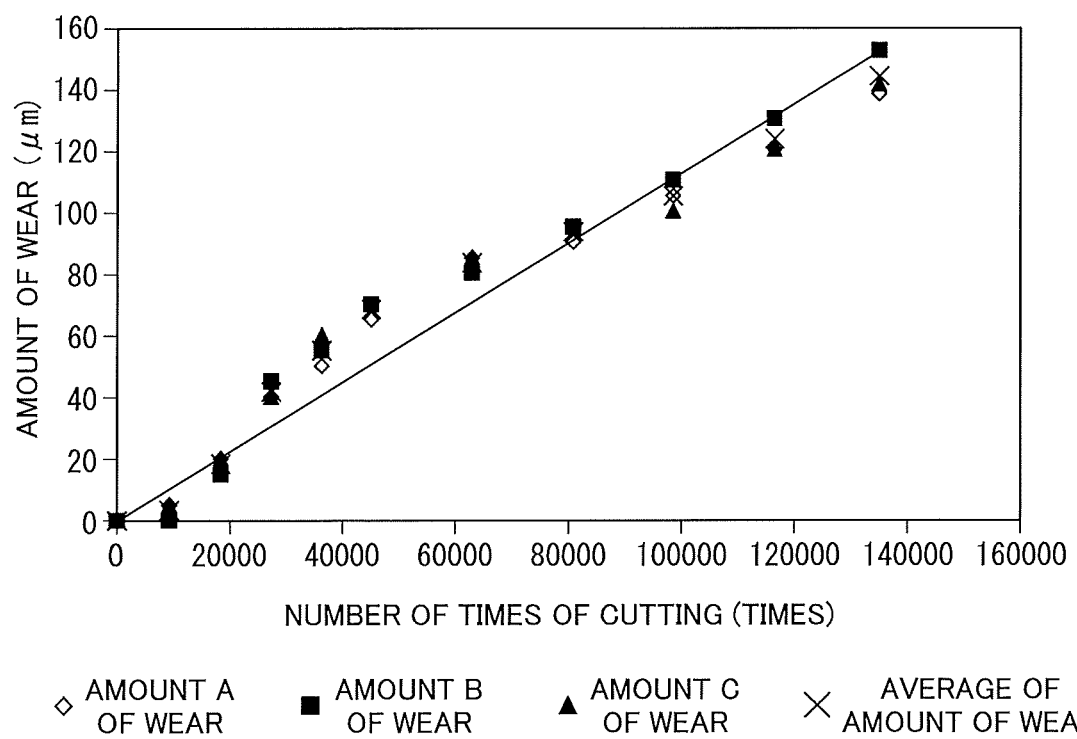
FIG. 21 is a graph illustrating a relationship between the number of times of cutting and the amount of wear of the tip of the blade edge portion.
Figure 22:
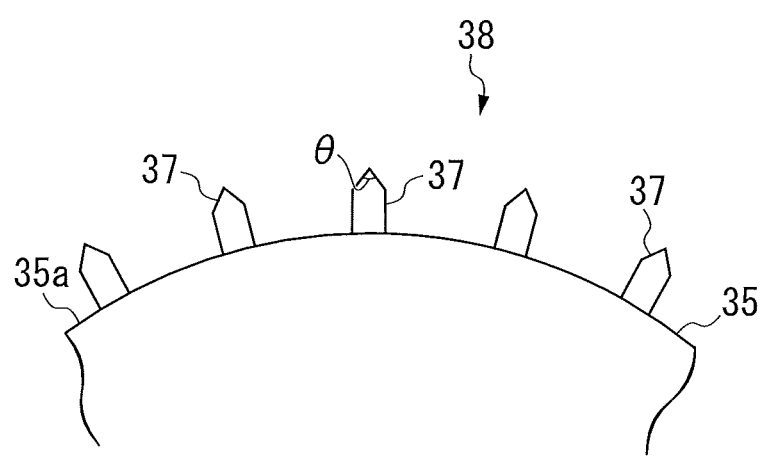
FIG. 22 is an enlarged schematic structural diagram of a cutter roller used in Example 51.

In FIG. 21, the amount A of wear, the amount B of wear, and the amount C of wear were measurement results of the amount of wear of the cutting blades that were arranged at an interval of about 120° in the circumferential direction of the roller.

The approximation straight line of the amount of wear of the tip of the blade edge portion with respect to the number of times of cutting was made by the method of least squares and the inclination of this straight line was obtained.

Examples 2 to 19, Examples 21 to 25, and Examples 31 to 33

The cutting of carbon fiber bundles was performed in the same manner as Example 1 except that the material and the thickness T of the base portion and the blade edge portion of each cutting blade, the blade angle θ of the tip of the blade edge portion, and the coating layer provided on the blade edge portion were changed as illustrated in Table 1.

In Table 1, A-DLC is an abbreviation for amorphous diamond-like carbon, DLC is an abbreviation for diamond-like carbon, and TiN is an abbreviation for titanium nitride.

With regard to each example, the approximation straight line of the amount of wear of the tip of the blade edge portion with respect to the number of times of cutting was made by the method of least squares and the inclination of this straight line was obtained. Lifetime effects were obtained from the following equation. The lifetime effects were illustrated in Table 1.

Lifetime effect (%)=(inclination of straight line of each example/inclination of straight line of Example 1)

TABLE 1

| | Material | Thickness T [mm] | Blade angle θ of tip [degree] | θ/T | Coating layer Type | Thickness [μm] | Lifetime effect [%] |
|---|---|---|---|---|---|---|---|
| Example 1 | SKS81 | 0.3 | 20 | 67 | None | — | 100.0 |
| Example 2 | SKS81 | 0.3 | 20 | 67 | A-DLC | 1 | 110.0 |
| Example 3 | SKD11 | 0.3 | 20 | 67 | None | — | 91.7 |
| Example 4 | SKD11 | 0.3 | 20 | 67 | TiN | 3 | 122.2 |
| Example 5 | SKD11 | 0.3 | 20 | 67 | DLC | 0.2 | 110.0 |
| Example 6 | SKD11 | 0.3 | 20 | 67 | A-DLC | 1 | 91.7 |
| Example 7 | SKD11 | 0.3 | 30 | 100 | None | — | 116.7 |
| Example 21 | SKD11 | 0.3 | 30 | 100 | TiN | 3 | 157.1 |
| Example 8 | SKD11 | 0.3 | 30 | 100 | DLC | 0.2 | 100.0 |
| Example 9 | SKD11 | 0.3 | 30 | 100 | A-DLC | 1 | 122.2 |
| Example 10 | SKD11 | 0.5 | 30 | 60 | None | — | 116.7 |

TABLE 1-continued

|  | Material | Thickness T [mm] | Blade angle θ of tip [degree] | θ/T | Coating layer Type | Thickness [μm] | Lifetime effect [%] |
|---|---|---|---|---|---|---|---|
| Example 22 | SKD11 | 0.5 | 30 | 60 | TiN | 3 | 233.3 |
| Example 11 | SKD11 | 0.5 | 30 | 60 | DLC | 0.2 | 87.5 |
| Example 23 | SKD11 | 0.5 | 40 | 80 | None | — | 175.0 |
| Example 12 | SKH51 | 0.3 | 20 | 67 | None | — | 63.6 |
| Example 13 | SKH51 | 0.3 | 20 | 67 | TiN | 3 | 140.0 |
| Example 14 | SKH51 | 0.3 | 20 | 67 | DLC | 0.2 | 87.5 |
| Example 15 | SKH51 | 0.3 | 30 | 100 | None | — | 93.8 |
| Example 24 | SKH51 | 0.3 | 30 | 100 | TiN | 3 | 175.0 |
| Example 16 | SKH51 | 0.3 | 30 | 100 | DLC | 0.2 | 70.0 |
| Example 17 | SKH51 | 0.3 | 20 | 67 | A-DLC | 1 | 70.0 |
| Example 18 | SKH51 | 0.3 | 30 | 100 | A-DLC | 1 | 87.5 |
| Example 19 | SKH51 | 0.5 | 30 | 60 | None | — | 116.7 |
| Example 25 | SKH51 | 0.5 | 40 | 80 | None | — | 175.0 |
| Example 31 | Super hard alloy | 0.3 | 30 | 100 | A-DLC | 1 | 777.8 |
| Example 32 | Super hard alloy | 0.5 | 30 | 60 | None | — | 777.8 |
| Example 33 | Super hard alloy | 0.5 | 40 | 80 | None | — | 875.0 |

It was found that high lifetime effect was high and it was difficult for the blade edge to be worn in the cases of Examples 21, 22, and 24 where the blade angle θ of the tip of the blade edge portion was 30° and a coating layer provided on the surface of the blade edge portion was TiN and Examples 23 and 25 where the blade angle θ of the tip of the blade edge portion was 40° even though there was no coating layer provided on the surface of the blade edge portion.

In the cases of Examples 31 to 33 where the material of each of the base portion and the blade edge portion of the cutting blade was cemented carbide, lifetime effect was significantly high but the price of the cutting blade was 30 or more times the price of the cutting blade made of a steel material and cost-effectiveness was low.

Example 41

Figure 16:
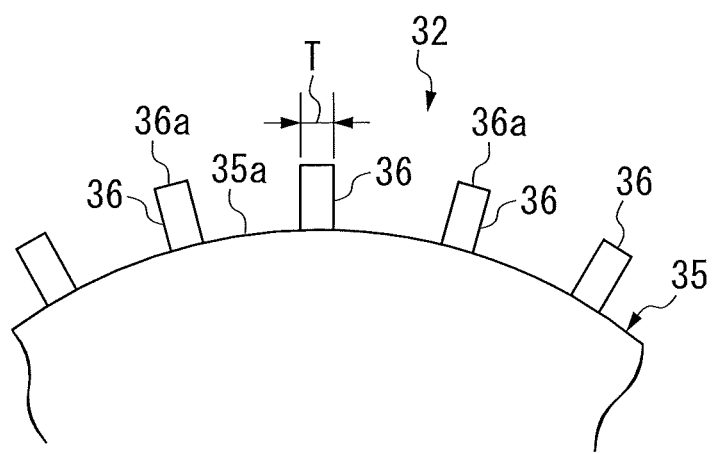
FIG. 16 is an enlarged view of a cutter roller of the cutter of FIG. 15.

The cutter 31, which included the cutter roller 32 illustrated in FIGS. 15 and 16 and provided with the plurality of blades 36 on which the tip surfaces 36a were formed, was prepared. The diameter of the roller body 35 was set to 210 mm, and the length of the roller body 35 was set to 900 mm. The thickness of the blade 36 was set to 0.10 mm, the height of the blade 36 was set to 8 mm, and the length of the blade 36 was set to 900 mm. The material of the cutter roller 32 was SK4. Further, the diameter of the rubber roller 33 was set to 190 nm, and the length of the rubber roller 33 was set to 970 mm. The material of the rubber roller 33 was natural rubber. The diameter of the pinch roller 34 was set to 87 mm, and the length of the pinch roller 34 was set to 900 mm. The material of the pinch roller 34 was made of S55C subjected to hard chrome plating.

Examples 42 to 47

The same cutters 31 as Example 41 except that the thickness of the blade 36 was changed as illustrated in Table 2 were prepared.

Example 51

The same cutter as Example 41 except that the cutter roller 32 was changed to a cutter roller 38 provided with blades 37 (FIG. 22) of which tip portions were sharpened so that the blade angle θ was 20° was prepared.

(Evaluation of Damage to Rubber Roller)

A carbon fiber bundle (trade name "TR50S15L", tensile strength: 4900 MPa, width: 7.5 mm, thickness: 0.10 mm, the number of filaments: 15000, manufactured by Mitsubishi Rayon Co., Ltd.) was used as a long fiber bundle, fiber bundles are cut by 500 m in the cutter of each example, and chopped fiber bundles having an average fiber length of 25.4 mm were produced. Then, the state of the outer peripheral surface of each rubber roller was visually checked, and was evaluated on the basis of the following criteria.

(Evaluation Criteria)

○: The outer peripheral surface of the rubber roller was hardly damaged and the generation of rubber scraps did not appear.

x: The outer peripheral surface of the rubber roller was damaged and the generation of rubber scraps appeared.

(Evaluation of Cutting Performance for Fiber Bundles)

The following fiber bundles (1) to (6) were continuously cut by the cutter of each example, and cutting performance was evaluated on the basis of the following criteria.

Fiber bundle (1): Carbon fiber bundle (trade name "TR30S3L", tensile strength: 4410 MPa, width: 2.5 mm, thickness: 0.05 mm, the number of filaments: 3000, manufactured by Mitsubishi Rayon Co., Ltd.).

Fiber bundle (2): Carbon fiber bundle (trade name "TR50S15L", tensile strength: 4900 MPa, width: 7.5 mm, thickness: 0.10 mm, the number of filaments: 15000, manufactured by Mitsubishi Rayon Co., Ltd.).

Fiber bundle (3): Carbon fiber bundle (trade name "TRW40S50L", tensile strength: 4100 MPa, width: 12.5 mm, thickness: 0.20 mm, the number of filaments: 50000, manufactured by Mitsubishi Rayon Co., Ltd.).

Fiber bundle (4): Carbon fiber bundle (trade name "TRW40S50L", opening, tensile strength: 4100 MPa, width: 16.7 mm, thickness: 0.15 mm, the number of filaments: 50000, manufactured by Mitsubishi Rayon Co., Ltd.).

Fiber bundle (5): Carbon fiber bundle (trade name "TRW40S50L", double opening, tensile strength: 4100 MPa, width: 25 mm, thickness: 0.10 mm, the number of filaments: 50000, manufactured by Mitsubishi Rayon Co., Ltd.).

Fiber bundle (6): Carbon fiber bundle (trade name "TRW40S50L", quadruple opening, tensile strength: 4100 MPa, width: 50 mm, thickness: 0.05 mm, the number of filaments: 50000, manufactured by Mitsubishi Rayon Co., Ltd.).

(Evaluation Criteria)
○: Fiber bundles were sufficiently cut.
Δ: Uncut portions appeared in fiber bundles.
Evaluation results of the respective examples were illustrated in Table 2.

TABLE 2

| | Blade of cutter roller | | | | Damage to outer peripheral surface of rubber roller | Cutting performance for fiber bundles | | | | | |
|---|---|---|---|---|---|---|---|---|---|---|---|
| | Presence or absence of tip surface | Thickness T [mm] | Blade angle θ of tip [degree] | θ/T | | Fiber bundle (1) | Fiber bundle (2) | Fiber bundle (3) | Fiber bundle (4) | Fiber bundle (5) | Fiber bundle (6) |
| Example 41 | Presence | 0.10 | 180 | 1800 | ○ | ○ | ○ | ○ | ○ | ○ | ○ |
| Example 42 | Presence | 0.11 | 180 | 1636 | ○ | ○ | ○ | ○ | ○ | ○ | ○ |
| Example 43 | Presence | 0.12 | 180 | 1500 | ○ | ○ | ○ | ○ | ○ | ○ | ○ |
| Example 44 | Presence | 0.13 | 180 | 1385 | ○ | ○ | ○ | Δ | ○ | ○ | ○ |
| Example 45 | Presence | 0.14 | 180 | 1286 | ○ | ○ | ○ | Δ | Δ | ○ | ○ |
| Example 46 | Presence | 0.15 | 180 | 1200 | ○ | ○ | ○ | Δ | Δ | Δ | ○ |
| Example 47 | Presence | 0.20 | 180 | 900 | ○ | ○ | ○ | Δ | Δ | Δ | Δ |
| Example 51 | Absence | 0.10 | 20 | 200 | × | ○ | ○ | ○ | ○ | ○ | ○ |

As illustrated in Table 2, the outer peripheral surfaces of the rubber rollers were not damaged and rubber scraps were not generated in the cases of the cutters of Examples 41 to 47 that use the cutter rollers provided with the blades on which the tip surfaces perpendicular to the height direction were formed. Further, all of the fiber bundles (1) to (6) could be cut without uncut portions in the cases of the cutters of Examples 41 to 43 where the thickness of each blade was 0.12 nm or less.

On the other hand, the outer peripheral surface of the rubber roller was not damaged and rubber scraps were generated in the case of the cutter of Example 51 that uses the cutter roller provided with the blades on which the tip surfaces perpendicular to the height direction were not formed.

INDUSTRIAL APPLICABILITY

According to the producing device and producing method for chopped fiber bundles of the first mode of the invention, the generation of defective products in which chopped fiber bundles are connected is suppressed over a long time. Accordingly, the producing device and producing method for chopped fiber bundles of the first mode of the invention are useful as a producing device and producing method for chopped fiber bundles to be contained in fiber-reinforced resin forming materials.

Since it is difficult for the blade edge of the cutting blade for carbon fiber bundles according to the second mode of the invention to be worn and the cutting blade for carbon fiber bundles according to the second mode of the invention is inexpensive, the cutting blade for carbon fiber bundles according to the second mode of the invention is useful as a cutting blade that is used to produce chopped carbon fiber bundles.

EXPLANATIONS OF LETTERS OR NUMERALS

11: supply hose
12: guide roller
13: comb guide
13a: rod
13b: base
14: scratch bar
15: chopper unit
16: rotary cutter
16a: roller
16b: cutting blade
17: anvil roller
18: touch roller
19: oscillating device
19a: first connecting rod
19b: second connecting rod
26: rotary cutter for carbon fiber bundles
26a: roller
26b: cutting blade for carbon fiber bundles
31: cutter
32: cutter roller
33: rubber roller
33a: outer peripheral surface
34: pinch roller
35: roller body
35a: outer peripheral surface
36: blade
36a: tip surface
37: blade
38: cutter roller
110: fiber bundle supply means
111: first sheet supply means
112: first coating means
113: chopped fiber bundle-producing means
114: second sheet supply means
115: second coating means
116: impregnation means
117: bobbin
118: guide roller
119: first conveying unit
120: guide roller
121a: pulley
121b: pulley
122: endless belt
123: conveyor 124: supply box
128: second conveying unit
129: guide roller
130: supply box
131: bonding mechanism
132: pressure applying mechanism
133: bonding roller
134a: pulley
134b: pulley
134c: pulley
134d: pulley
135a: endless belt
135b: endless belt
136A: lower conveyor
136B: upper conveyor
137a: tension pulley
137b: tension pulley
137c: tension pulley
137d: tension pulley
138a: lower roller
138b: upper roller
213: chopped carbon fiber bundle-producing means
261: base portion
262: blade edge portion
300: producing device
310: fiber bundles supply unit
311: first carrier sheet supply unit
312: first coating unit
314: second carrier sheet supply unit
315: second coating unit
316: impregnation unit
317: bobbin
318: guide roller
320: first conveying unit
321a: pulley
321b: pulley
322: endless belt
323: conveyor
324: coater
328: second conveying unit
329: guide roller
330: coater
331: bonding mechanism
332: pressure applying mechanism
333: bonding roller
334a: pulley
334b: pulley
334c: pulley
334d: pulley
335a: endless belt
335b: endless belt
336A: lower conveyor
336B: upper conveyor
337a: lower roller
337b: upper roller
340: storage container
C1: first carrier sheet
C2: second carrier sheet
CF: chopped fiber bundle
CF: chopped carbon fiber bundle
F: fiber bundle
F': carbon fiber bundle
f: fiber bundle
f': fiber bundle
H: height
L: length
P: paste R: original fabric
R': fiber-reinforced resin material
R1: first original fabric roll
R2: second original fabric roll
S1: first release sheet
S2: second release sheet
S3: bonded sheet
S'1: first resin sheet
S'2: second resin sheet
S'3: precursor laminate
SF: sheet-like fiber bundle group
T: thickness
θ: blade angle

The invention claimed is:

1. A producing device for chopped fiber bundles comprising:
a chopper unit comprising a rotary cutter for cutting a plurality of long fiber bundles which are arranged in parallel with each other and supplied to the chopper unit with a traveling direction orthogonal to a rotation axis of the rotary cutter;
a comb guide for restricting each of the long fiber bundles to be supplied to the chopper unit from moving relative to the comb guide in a direction parallel to the rotation axis of the rotary cutter; and
a scratch bar, provided between the chopper unit and the comb guide, that widens the long fiber bundles.

2. The device according to claim 1,
wherein the comb guide can be oscillated relative to the chopper unit in a direction parallel to the rotation axis of the rotary cutter.

3. The device according to claim 2,
wherein the scratch bar can be oscillated in synchronization with the comb guide.

4. A producing device for fiber-reinforced resin forming materials comprising:
the producing device for chopped fiber bundles according to claim 3; and
impregnation means for impregnating a matrix resin composition into chopped fiber bundles obtained by the producing device for chopped fiber bundles.

5. A producing device for fiber-reinforced resin forming materials comprising:
the producing device for chopped fiber bundles according to claim 2; and
impregnation means for impregnating a matrix resin composition into chopped fiber bundles obtained by the producing device for chopped fiber bundles.

6. A producing device for fiber-reinforced resin forming materials comprising:
the producing device for chopped fiber bundles according to claim 1; and
impregnation means for impregnating a matrix resin composition into chopped fiber bundles obtained by the producing device for chopped fiber bundles.

7. The device according to claim 1, wherein the chopper unit further comprises an anvil roller that is positioned on the upstream side of the rotary cutter in the travel direction of the fiber bundles and is adjacent to the rotary cutter, and a touch roller that is positioned on the upstream side of the rotary cutter in the travel direction of the fiber bundles and is adjacent to the anvil roller.

8. A producing method for chopped fiber bundles comprising:
supplying a plurality of long fiber bundles arranged in parallel with each other to a chopper unit comprising a rotary cutter for cutting a plurality of the long fiber bundles with a traveling direction of a plurality of the long fiber bundles orthogonal to a rotation axis of the rotary cutter;

restricting each of a plurality of the long fiber bundles supplied to the chopper unit by using a comb guide from moving relative to the comb guide in a direction parallel to the rotation axis of the rotary cutter;

widening the width of each of the long fiber bundles by a scratch bar, provided between the chopper unit and the comb guide, to provide plurality of widened long fiber bundles; and producing chopped fiber bundles by cutting the widened of long fiber bundles with the chopper unit.

9. The method according to claim 8, wherein the comb guide is oscillated relative the chopper unit in a direction parallel to the rotation axis of the rotary cutter.

10. The method according to claim 9, wherein the scratch bar, provided between the chopper unit and the comb guide, that widens the long fiber bundles is oscillated in synchronization with the comb guide.

11. A producing method for fiber-reinforced resin forming materials comprising:

obtaining chopped fiber bundles by the producing method for chopped fiber bundles according to claim 10; and impregnating a matrix resin composition into the chopped fiber bundles.

12. A producing method for fiber-reinforced resin forming materials comprising:

obtaining chopped fiber bundles by the producing method for chopped fiber bundles according to claim 9; and impregnating a matrix resin composition into the chopped fiber bundles.

13. A producing method for fiber-reinforced resin forming materials comprising:

obtaining chopped fiber bundles by the producing method for chopped fiber bundles according to claim 8; and impregnating a matrix resin composition into the chopped fiber bundles.

14. The method according to claim 8, wherein the chopper unit further comprises an anvil roller that is positioned on the upstream side of the rotary cutter in the travel direction of the fiber bundles and is adjacent to the rotary cutter, and a touch roller that is positioned on the upstream side of the rotary cutter in the travel direction of the fiber bundles and is adjacent to the anvil roller.

15. The method according to claim 8, wherein the long fiber bundles are flat-unidirectional fiber bundles.

* * * * *